United States Patent

Sakou et al.

[11] Patent Number: 5,887,069
[45] Date of Patent: Mar. 23, 1999

[54] SIGN RECOGNITION APPARATUS AND METHOD AND SIGN TRANSLATION SYSTEM USING SAME

[75] Inventors: Hiroshi Sakou, Booterstown; Hirohiko Sagawa, Kokubunji; Masahiro Abe, Foxrock; Akira Ichikawa, Musashino; Kiyoshi Inoue, Tokyo; Kiyoshi Arai, Hachioji; Takanori Shimura, Chiba; Yuji Toda, Hachioji, all of Japan

[73] Assignee: Hitachi, Ltd., Tokyo, Japan

[21] Appl. No.: 567,875

[22] Filed: Dec. 6, 1995

Related U.S. Application Data

[63] Continuation-in-part of Ser. No. 111,380, Aug. 24, 1993, abandoned, which is a continuation-in-part of Ser. No. 29,046, Mar. 9, 1993, Pat. No. 5,473,705.

[30] Foreign Application Priority Data

| Mar. 10, 1992 | [JP] | Japan | 4-051300 |
| Aug. 24, 1992 | [JP] | Japan | 4-247285 |
| Sep. 3, 1992 | [JP] | Japan | 4-235633 |

[51] Int. Cl.$^6$ .................................................... G06K 9/00
[52] U.S. Cl. .......................... 382/100; 383/209; 383/215; 395/2.8; 434/112; 434/116
[58] Field of Search .................................... 382/100, 107, 382/159, 160, 209, 215; 395/2.5, 2.52, 2.53, 2.8, 2.86; 434/112, 116

[56] References Cited

U.S. PATENT DOCUMENTS

| 4,307,266 | 12/1981 | Messina . |
| 4,368,459 | 1/1983 | Sapora . |
| 4,414,537 | 11/1983 | Grimes . |

(List continued on next page.)

FOREIGN PATENT DOCUMENTS

| 586259 | 9/1993 | European Pat. Off. . |
| 600605 | 10/1993 | European Pat. Off. . |
| 2-14000 | 1/1990 | Japan . |

(List continued on next page.)

OTHER PUBLICATIONS

Systems & Computers in Japan, vol. 23, No. 3, 1992, New York US, pp. 38–48, T. Takahashi and F. Kishino, "A Hand Gesture Recognition Method and Its Application", and Denshi Joho Tsushin Gakkai Ronbunshi, vol. 73–D–II, No. 12, Dec. 1990, pp. 1985–1992, Original Publication, source of translation.

(List continued on next page.)

*Primary Examiner*—Leo H. Boudreau
*Assistant Examiner*—Phuoc Tran
*Attorney, Agent, or Firm*—Fay, Sharpe, Beall, Fagan, Minnich & McKee

[57] ABSTRACT

In continuous sign language recognition, reference sign language patterns of good quality are generated. Continuous sign language patterns and reference sign language patterns are efficiently compressed. The compressed continuous sign language patterns are sequentially and directly matched with the compressed reference sign language patterns to recognize the sign language at high speed and with high precision. A reference sign pattern generating unit generates a reference sign language pattern by normalizing sample patterns while taking into consideration of their nonlinear compression/expansion and by calculating an average of the sample patterns. A continuous sign language recognition unit recognizes a continuous sign language at high speed by sequentially matching the continuous sign language of time sequential patterns with reference sign language patterns while allowing nonlinear expansion and compression in the time domain. A sign language translation system is provided in which a sign language as well as the facial expression or emotion of a sign language user is recognized and converted into a spoken language with emotion, and transferred in the form of texts, voices, sign languages of another type to a particular partner among a plurality of unknown system users.

30 Claims, 21 Drawing Sheets

U.S. PATENT DOCUMENTS

| | | |
|---|---|---|
| 4,546,383 | 10/1985 | Abramatic et al. . |
| 4,600,919 | 7/1986 | Stern . |
| 4,601,054 | 7/1986 | Watari et al. ............................... 382/1 |
| 4,878,843 | 11/1989 | Kuch . |
| 4,975,961 | 12/1990 | Sakoe ....................................... 381/43 |
| 5,047,952 | 9/1991 | Kramer et al. ....................... 364/513.5 |
| 5,473,705 | 12/1995 | Abe et al. . |

FOREIGN PATENT DOCUMENTS

| | | |
|---|---|---|
| 02-144675 | 6/1990 | Japan . |
| 2-144675 | 6/1990 | Japan . |
| 02 183 371 | 7/1990 | Japan . |
| 3-186979 | 8/1991 | Japan . |
| 4-51372 | 2/1992 | Japan . |
| 04 156 610 | 5/1992 | Japan . |
| 4-134515 | 5/1992 | Japan . |
| 4-222014 | 8/1992 | Japan . |
| 4-363755 | 12/1992 | Japan . |
| 5-10704 | 2/1993 | Japan . |
| 6-67601 | 3/1994 | Japan . |
| 6-138815 | 5/1994 | Japan . |
| WO89-12290 | 12/1989 | WIPO . |

OTHER PUBLICATIONS

Proceedings of the 1st International Conference, PIXIM 88, Computer Graphics In Paris, 28 Oct. 1988, Paris, France, pp. 345–360, F. Nouboud et al, "Authentification de signatures manuscrites per programmation dynamique".

IEEE Proceedings of the Joint Conference on Neural Networks Cat. No. 91CH3065–0, vol. 1, 21 Nov. 1991, Singapore, pp. 460–466, H. Kobayashi and F. Hara, "The Recognition of Basic Facial Expressions by Neural Network".

IEEE Proceedings of the Second Conference on Artificial Intelligence Applications, The Engineering of Knowledge–Based Systems, Cat. No. CH2215–2/85, 13 Dec. 1985, Miami Beach, Florida, pp. 666–670, K. H. Wong and F. Fallside, "Dynamic Programming in the Recognition of Connected Handwritten Script".

H. Kawai et al, The Journal of the Institute of Television Engineers of Japan, vol. 44, No. 3, pp. 305–311 (1990).

M. Terauchi et al, The Journal of Information Processing Society of Japan, Human Interface 41–7, Mar. 2, 1992, pp. 49–54.

"Japanese Language Information Processing", The Institute of Electronics, Information and Communication Engineers of Japan, May 30, 1984, pp. i–vii.

K. Arai, The Journal of Information Processing Society of Japan, Graphics and CAD 57–3, Jul. 24, 1992, pp. 17–24.

N. Badler et al, "Digital Representations of Human Movement," Computing Surveys, vol. II, No. 1, Mar. 1979, pp. 19–38.

N. Badler et al, "Special Problems in Human Movement Simulation," ACM, 1980, pp. 189–197.

E. Holden et al, "The Graphical Translation of English Text Into Signed English in the Hand Sign Translator System," Eurographics, vol. II, No. 3, 1992, pp. C357–C366

J. Xu et al, "A Method for Synthesizing Animation to Transmit Sign Language by Intelligent Communication," Electronics and Communications in Japan, Part 3, vol. 76, No. 2, 1993, pp. 108–117.

N. Uda et al, Technical Report of IPSJ, Information Processing Society of Japan, vol. 90, No. 66, 90–CG–46, 46–6, Aug. 1990, pp. 37–42.

K. Aria et al, Technical Report of IPSJ, Information Processing Society of Japan, vol. 90, No. 65, 90–CG–45, 45–5, Jul. 1990, pp. 1–8.

T. Miyajima et al, "Facial Expression Recognition Using Neural Network," IEICE (The Institute of Electronics, Information and Communication Engineerings), Fall Conference D–408, 1990, pp. 6–410.

J. Xu et al, Gesture Description and Structure of a Dictionary for Intelligent Communications of Sign Language Images, Transactions of the Institute of Electronics, Information and Communication Enginggers, vol. J76–A, No. 9, Sep. 1993.

"Workplace Concepts in Sign and Text. A Computerized Sign Language Dictionary," Western Pennsylvania School for the Deaf, Pittsburgh, 1991.

Pattern Recognition, vol. 18, No. 3/4, 1985, "Deaf–And––Mute Sign Language Generation System", H. Kaway et al, pp. 199–205.

IEICE Transactions on Fundamentals of Electronics, Communications and Computr Sciences, vol. E75–A, No. 2, Feb. 1992, "Gesture Coding and a Gesture Dictionary for a Nonverbal Interface", T. Kurokawa, pp. 112–121.

Proceedings of the Johns Hopkins National Search for Computing Applications to Assist Persons with Disabilities, Feb. 1992, "Computer–Aided Cued Speech Training/Translation", K.L. Wilt et al, p. 29, col. 2, para. 3 – p. 30, col. 2, last paragraph.

S. Fels et al, "Glove–Talk: A Neural Network Interface Between a Data–Glove and a Speech Synthesizer," IEEE Transactions on Neural Netowrks, vol. 4, No. 1, Jan. 1993, pp. 2–8.

T. Takahashi et al, "A Hand Gesture Recognition Method and Its Application," Systems and Computers in Japan, vol. 23, No. 3, Jan. 1, 1992, pp. 38–48.

K. Murakami et al, "Gesture Recognition Using Recurrent Neural Networks," Human Factors in Computing Systems, Reaching Through Technology, Chi '91, Conference Proceedings, New Orleans, LA, Apr. 27–May 2, 1991, pp. 237–243.

"Continuous Word Recognition Using Continuous DP", by Oka, the speech study Group of Acoustical Society of Japan, S78–20, 1978, pp. 145–152.

"Pattern Recognition and Learning Algorithms", Kamisaka et al, Bunichi Sogo, p. 91.

"Auditory Sense and Voices", by Mirua, Institute of Electronics and Communiation Engineers, 1980.

Hitachi news release of Aug. 31, 1992.

Article in the Yomiuri newspaper of Sep. 1, 1992.

Article in the Nikkei newspaper of Sep. 1, 1992. .

FIG. 3
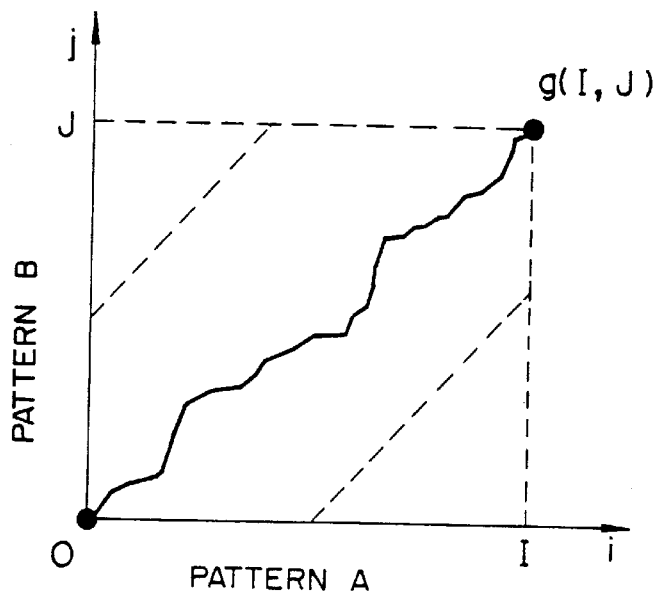
FIG. 4A    FIG. 4B
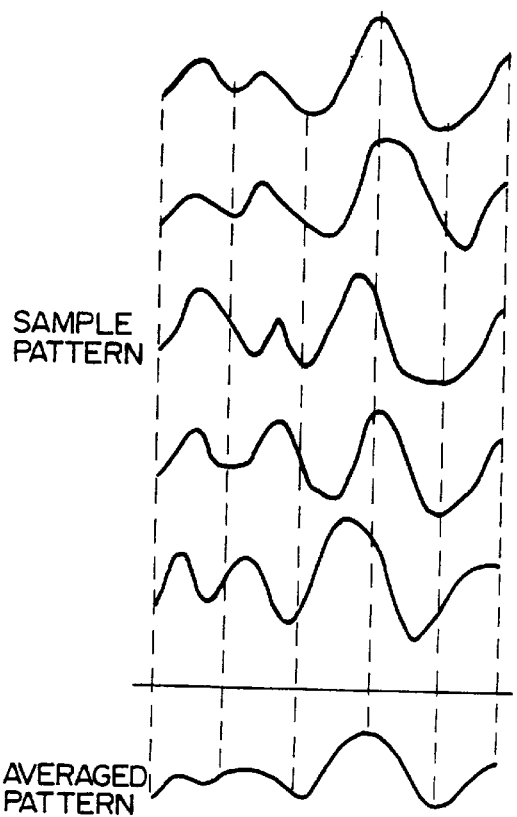
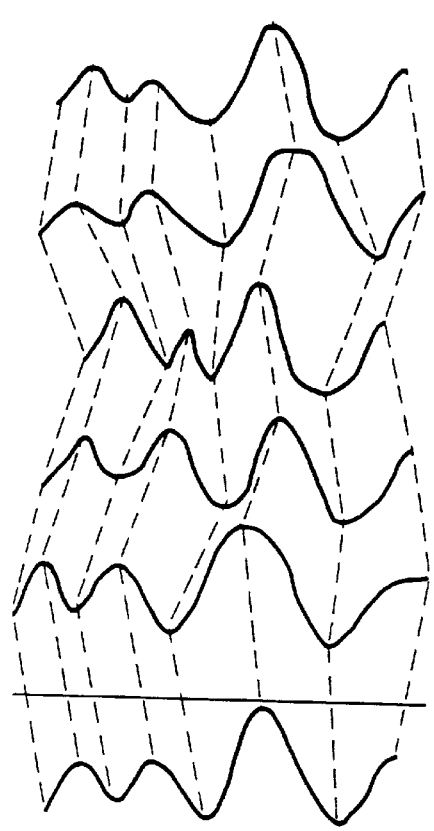

INPUT PATTERN 1, 2 --- INDICATING WEIGHT OF EACH PATH t1 (i) : TIME LENGTH AT i-TH CHARACTERISTIC POINT OF CONTINUOUS PATTERN t2 (j) : TIME LENGTH AT j-TH CHARACTERISTIC POINT OF REFERENCE PATTERN

SIGN RECOGNITION APPARATUS AND METHOD AND SIGN TRANSLATION SYSTEM USING SAME

This is a Continuation-In-Part application of Ser. No. 08/111,380, filed Aug. 24, 1993, abandoned, which is a Continuation-In-Part application of U.S. patent application Ser. No. 08/029,046, filed on Mar. 9, 1993, now U.S. Pat. No. 5,473,705, the disclosure of which is hereby incorporated by reference.

BACKGROUND OF THE INVENTION

1. Field of the Invention

The present invention relates to a continuous sign language recognition apparatus and method. More particularly, the invention relates to a technique of generating reference sign language patterns used for the recognition of continuous sign language patterns through the pattern matching between a continuous sign language and reference sign language. The term "continuous sign language pattern" used in this specification includes also a template pattern.

The present invention also relates to a technique of recognizing a series of continuous sign language patterns which are contained in a sign language and are similar to reference sign language patterns.

The present invention also relates to a sign language translation system in which a recognized sign language is transferred in the system in the form of texts, voices, and sign languages of another type.

2. Description of the Related Art

As conventional techniques regarding sign recognition, there have been proposed "Hand Motion Recognition Apparatus and Sign Language Translation System" in JP-A-2-144675 (first conventional technique) and "Hand Motion Recognition Method using Neuro-computer" in JP-A-3-186979 (second conventional technique). According to the first conventional technique, colored gloves are used to obtain the positional relation between fingers by an image recognition technique. This positional relation is matched with pre-stored finger spelling patterns to recognize each finger spelling. According to the second conventional technique, the correspondence between finger shape data inputted from glove-like means and the meaning of the finger shape is learnt by a neural network, and an output obtained when inputting the finger shape data is inputted to the network is used as the recognized finger spelling.

A reference pattern to be used for the matching between continuous patterns and reference patterns has been obtained heretofore by linearly normalizing sample patterns for the reference pattern in the time axis direction and by simply averaging these normalized sample patterns.

"Motion Recognition Apparatus using Neurocomputer" has also been proposed in JP-A-4-51372 (third conventional technique). According to the third conventional technique which is an improved version of the second conventional technique; a three-dimensional motion is time sequentially detected by using a recurrent type neural network to recognize the meaning of one motion (e.g., of a sign language).

A continuous DP matching scheme has also been proposed as the recognition method through the matching between time sequential continuous patterns and reference patterns ("Continuous Word Recognition using Continuous DP", by OKA, the Speech Study Group of Acoustical Society of Japan, S78–20, pp.145 to 152, 1978) (fourth conventional technique). According to the fourth conventional technique, continuous voice patterns are sequentially matched with reference voice patterns while moving the latter in the time axis direction to recognize reference voice patterns contained in the continuous voice patterns. This matching result is a time sequence of similarities between the continuous patterns and reference patterns. A minimum value of the similarities at a threshold level or lower is searched from the similarity time sequence for each reference pattern, and the time at the minimum value is used to identify a reference pattern candidate.

The first and second conventional techniques for the sign language recognition are mainly directed to finger spellings which are generally static patterns. It is therefore unable to recognize a usual sign language with complicated motions of fingers and hands.

If a reference pattern is obtained from an average of sample sign language patterns by linearly expanding/compressing in the time domain and normalizing them without considering nonlinear expansion/compression, the resultant reference pattern becomes damped and does not reflect the characteristics of original sample patterns as shown in FIG. 4A.

With the third conventional technique, time sequential data of more or less dynamic can be recognized by using a recurrent type neutral network. Although it is possible to recognize time sequential data representing one motion, it is difficult to properly cut out each sign language word from a series of words which are often used in a practical sign language.

With the fourth conventional technique for the matching between continuous patterns and reference patterns, if data of both the continuous patterns and reference patterns sampled at a predetermined timing is used as it is, the time required for the matching increases in proportion to the length of the continuous patterns and the number of reference patterns.

Other issues associated with sign language translation are as follows.

(1) There is a difference, between persons, of finger shapes, hand positions, and their motions. According to the teaching of voice recognition, voices of a known person can be recognized more easily than voices of unknown persons. In the case of finger spellings, the number of finger spellings is as small as 50 words. It is therefore possible to register finger spellings of a particular person, or to learn the weight coefficients of a neural network dedicated to a particular person. However, in the case of a sign language, the number of basic words is as large as 1000 words or more. Therefore, the registration or learning for a particular person is impossible.

(2) Generally, the case where a reference to or a storage of past conversations of a sign language is desired, occurs frequently. However, this function has not been realized as yet.

(3) There are less sign words accompanied with emotions. From this reason, the facial expression or large body motion has been used. However, a normal person generally concentrates on the recognition of a sign language only, and the facial expression or large body motion is often disregarded. Accordingly, in order to realize a natural speech, it is necessary for a sign language translation system to provide a function of translating a sign language with emotion.

SUMMARY OF THE INVENTION

It is a first object of the present invention to provide an apparatus and method of sequentially recognizing reference sign language patterns contained in general continuous sign language patterns represented by the motions of fingers and hands.

It is a second object of the present invention to provide an apparatus and method of generating a reference sign language pattern without damaging the characteristics of each sample sign language pattern which might otherwise be damaged by nonlinear compression/expansion.

It is a third object of the present invention to provide an apparatus and method of recognizing at high speed a series of continuous sign language patterns having a nonlinear expansion/compression, the recognized patterns being similar to reference sign language patterns.

It is a fourth object of the present invention to provide a sign language translation system to be used by a plurality of unknown users, capable of recognizing a continuous sign language containing a number of words and having different characteristics, and transferring the recognized sign language in the form of various communication types.

According to the present invention, a reference sign language pattern is generated as an average of correspondence points between sample sign language patterns, the correspondence points being obtained by a DP matching after normalizing the sample patterns, while considering the nonlinear compression/expansion of the sample patterns.

Reference sign language patterns contained in continuous sign language patterns are recognized by a continuous DP matching between each continuous sign language pattern and reference sign language patterns while allowing a nonlinear expansion/compression.

The characteristic points are derived from a sign language pattern. These points are derived as the time when the velocity of an n-th order vector constituting the sign language pattern becomes minimum, the time when the direction change of the velocity vector exceeds a threshold value, the time when an accumulated value of direction changes of the velocity vector exceeds a threshold value, and the time when the acceleration becomes minimum. In accordance with all or some of these characteristic points, the sign language pattern is efficiently compressed without damaging the characteristics of the sign language pattern, by using all or some of pattern vectors at respective characteristic points, linear approximations of vectors between characteristic points, and time lengths between characteristic points. Each compressed continuous sign language pattern is matched directly with the compressed reference sign language patterns, reducing the recognition time.

The normalization in the DP matching considering a nonlinear compression/expansion allows to generate a reference sign language pattern without damaging the characteristics of the sign language patterns.

A general sign language with motions of fingers and hands can be continuously recognized by a continuous DP matching between the continuous sign language patterns and reference sign language patterns.

Furthermore, a sign language pattern is compressed in accordance with the characteristic points specific to the pattern, resulting in an efficient compression without damaging the characteristics. The compressed continuous sign language pattern is directly matched with the compressed reference sign language patterns, providing a high speed recognition.

Still further, according to the present invention, there are provided a sign language word dictionary for storing first sign language time sequential data of each sign language word as sign language word dictionary data, calibration means for calibrating second sign language time sequential data inputted as the continuous motions of fingers and hand, so as to make the second sequential data correspond to the first sign language time sequential data, and sign language translation means for matching an output of the calibration means with the sign language word dictionary data and recognizing the sign language data corresponding to the inputted second sign language time sequential data.

There are also provided matching means for receiving the second sign language time sequential data of a sign language word and the sign language word dictionary data corresponding to the second sign language time sequential data, obtaining and outputting correspondences between both the data at each timing, and selection means for selecting one of the inputted second sign language time sequential data and an output of the matching means, and outputting the selected one to the calibration means, wherein the calibration means learns the recognition parameters for the calibration in accordance with an output of the matching means.

A neural network is further provided for learning the recognition parameters for the calibration.

There is also provided spoken language translation means for adding a dependent word to the sign language word outputted from the sign language translation means, in accordance with a rule, and outputting a spoken language.

There are also provided means for inputting a portrait of a sign language user, and look recognition means for recognizing the look of the portrait to obtain the emotion type such as delight and grief and the emotion degree (intensity), wherein a spoken language added with emotional adjectives is outputted by using a spoken language outputted from the spoken language translation means and the emotion type and degree outputted from the look recognition means.

A sign language translation system may be installed at each of a plurality of stations connected to a local area network so that information can be transferred between a plurality of sign language translation systems.

Sign language time sequential data inputted from glove-like data input means is matched with each sign language word dictionary data while moving the latter in the time domain. The sign language word dictionary data can be matched with the time sequential data at respective maximum similarities (indicated by broken lines in FIG. 19). A characteristic of a sign language specific to each user, i.e. a difference between inputted some sign language word data and the corresponding sign language word dictionary data, can be learnt as a data conversion rule (calibration rule). By using the conversion rule, the sign language can be converted into data more similar to the sign language word dictionary data, improving the recognition precision.

With the look recognition means, the emotion expression can be translated realizing a more natural conversation.

BRIEF DESCRIPTION OF THE DRAWINGS

FIG. 3 is a diagram illustrating start/end points fixed DP matching;

FIG. 4A is a diagram showing an average pattern when the time axis is linearly normalized;

FIG. 4B is a diagram showing an average pattern when correspondence points between sample patterns are obtained by DP matching;

DESCRIPTION OF THE PREFERRED EMBODIMENTS

A first embodiment of the present invention will be described with reference to FIGS. 1 to 12.

Figure 1:
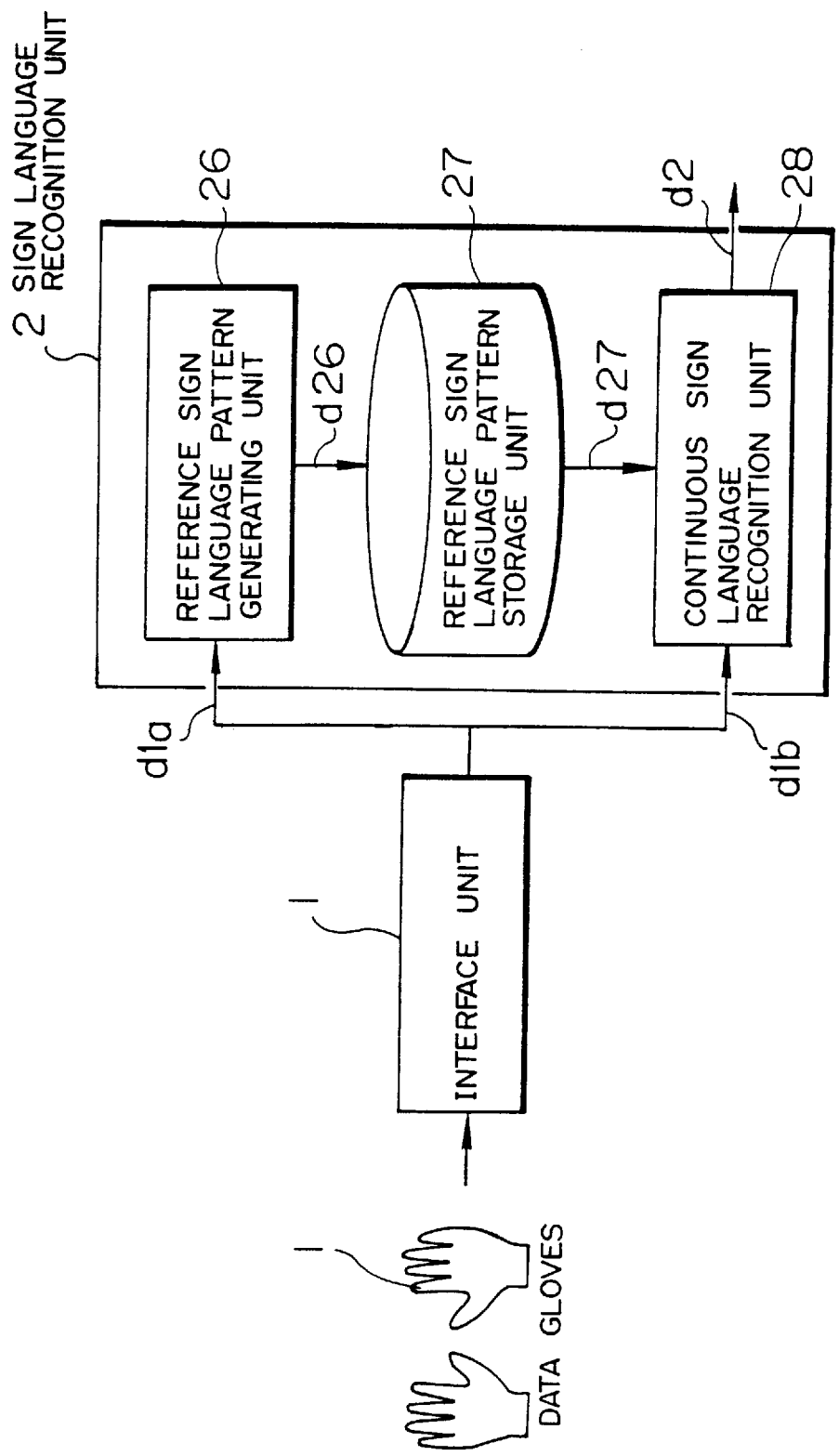
FIG. 1 shows the structure of a sign language recognition apparatus using a sign language recognition unit 2 according to a first embodiment of the present invention.

FIG. 1 is a block diagram of a continuous sign language recognition apparatus according to a first embodiment of the present invention.

In FIG. 1, reference numeral 1 represents data gloves for inputting a sign language to a computer (Data Glove is a registered trade mark of VPL Research Lab., U.S.A.). Reference numeral 1' represents an interface unit for converting a sign language into a time sequential continuous pattern of n-th order vector, and reference numeral 2 represents a sign language recognition unit. The sign language recognition unit 2 includes a reference sign language pattern generating unit 26, a reference sign language pattern storage unit 27, and a continuous sign language recognition unit 28 for recognizing a continuous sign language pattern.

In this embodiment, by the data gloves 1 and interface unit 1', the bending of the first and second articulations of each finger is detected based upon a difference of light intensity passing through optical fibers attached to the data gloves 1, and the position (spatial coordinates) and direction of each hand are detected by sensors attached to the backs of the data gloves 1. Sixteen data of one hand, and thirty two data of both hands, are picked up about thirty times per second.

A sign language inputted from the data gloves 1 is converted into a time sequential continuous sign language pattern of n-th order vector. The converted continuous sign language pattern is supplied to the reference sign language pattern generating unit 26 as its input signal d1$a$ when a reference sign language pattern is generated, and supplied to the continuous sign language recognition unit 28 as its input signal d1$b$. The reference sign language pattern generating unit 26 reads several sample sign language patterns of one word of a sign language of a user, and an average of these sample patterns is used as a reference sign language pattern of the sign language word which is then stored in the reference sign language pattern storage unit 27. In this manner, reference sign language patterns for other sign language words are stored in the storage unit 27. The continuous sign language recognition unit 28 recognizes inputted continuous sign language patterns by sequentially matching them with reference sign language patterns d27 stored in the storage unit 27.

Figure 2:
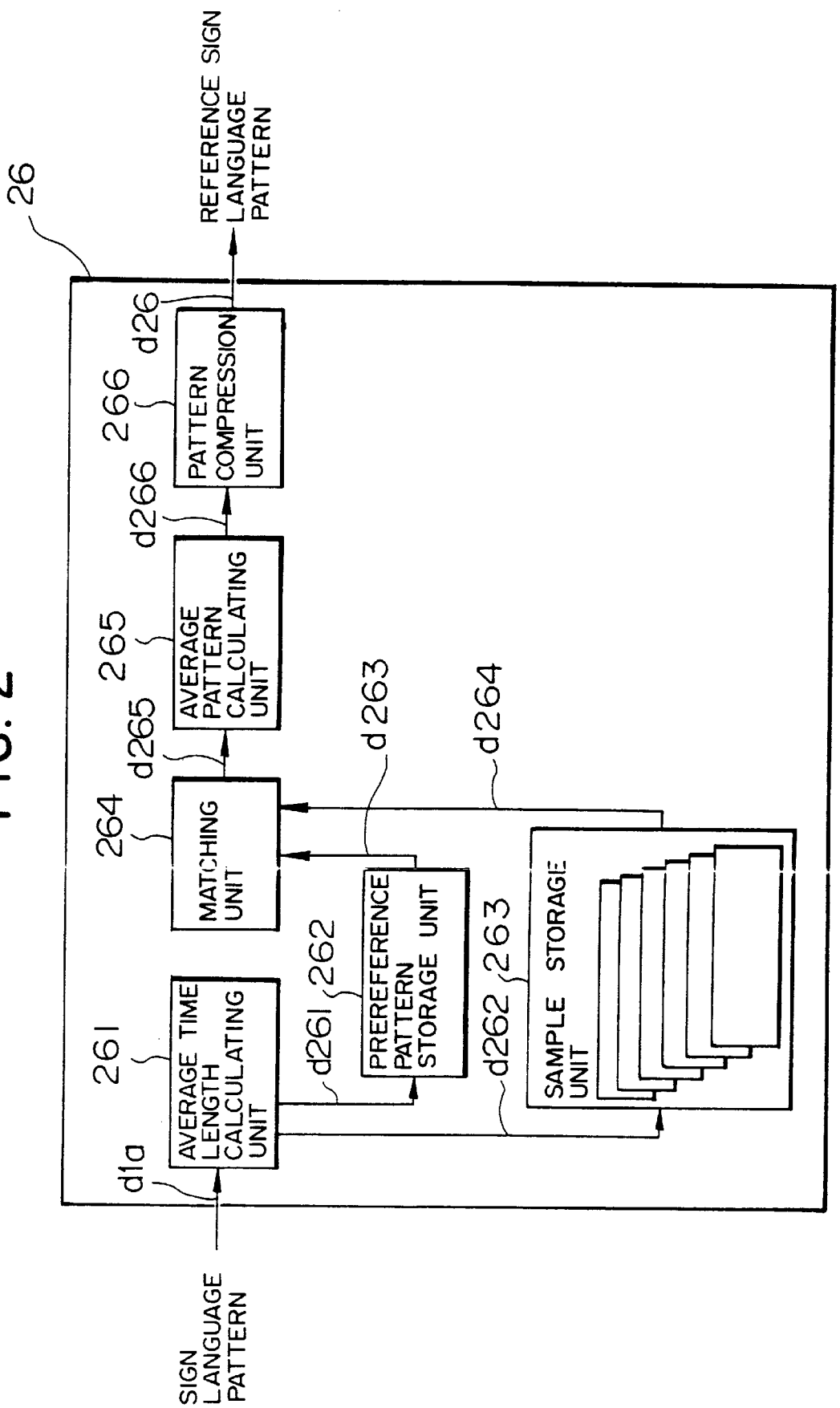
FIG. 2 is a diagram showing the structure of a reference sign language pattern generating unit 26 of the sign language recognition unit.

FIG. 2 is a block diagram showing the reference sign language pattern generating unit 26. Reference numeral 261 represents an average time length calculating unit for calculating an average time length of sample sign language patterns for each word inputted several times by a user. Reference numeral 262 represents a pre-reference pattern storage unit for storing one pre-reference sign language pattern selected from the sample sign language patterns inputted several times by the user, the pre-reference pattern being used as a reference of other sample sign language patterns. Reference numeral 263 represents a sample storage unit for storing the other sample sign language patterns excepting the pre-reference pattern. Reference numeral 264 represents a matching unit for checking a matching between the pre-reference pattern and other sample sign language patterns. Reference numeral 265 represents an average pattern calculating unit for calculating an average of inputted several sample sign language patterns of each word, based upon the match results by the matching unit 264. Reference numeral 266 represents a pattern compression unit.

All sample sign language patterns d1$a$ of each word inputted several times to the reference sign language pattern generating unit 26 are supplied to the average time length calculating unit 261. The average time length calculating unit 261 calculates an average of time lengths of all sample sign language patterns of each word inputted several times. The sample sign language pattern having a time length nearest the calculated average time length is stored as the pre-reference pattern in the pre-reference pattern storage unit 262. The other sample sign language patterns excepting the pre-reference pattern are stored in the sample storage unit 263. As the pre-reference pattern to be stored in the storage unit 262, any inputted sample sign language pattern linearly normalized to the average time length may also be used. The matching unit 264 then sequentially matches the respective sample patterns d264 stored in the sample storage unit 263 with the pre-reference pattern d263 stored in the pre-reference pattern storage unit 262. This pattern matching is executed by a dynamic programming (DP) scheme with the fixed start and end points. With this DP scheme, the pre-reference pattern and each sample pattern are matched as shown in FIG. 3 under the limited condition that the start and end points of both the patterns are always the same. With this matching, correspondence points between the pre-reference pattern d263 and the sample patterns d264 are obtained. The matching unit 264 outputs the checked sample pattern and correspondence point information d265. In accordance with the checked sample patterns and correspondence point information d265, the average pattern calculating unit 265 calculates an average of correspondence points and generates an average sign language pattern d266. Therefore, as shown in FIG. 4B, there is obtained the average sign language pattern which maintains the characteristic feature of the sample patterns even if they have nonlinear expansion/compression. The average sign language pattern d266 is then compressed by the pattern compression unit 266. The reference sign language pattern generating unit 26 outputs the compressed average sign language pattern as the reference sign language pattern d26. In this manner, the reference sign language pattern for one sign language word of a user is obtained. Reference sign language patterns of other words to be recognized are also obtained by the reference sign language pattern generating unit 26.

Figure 5:
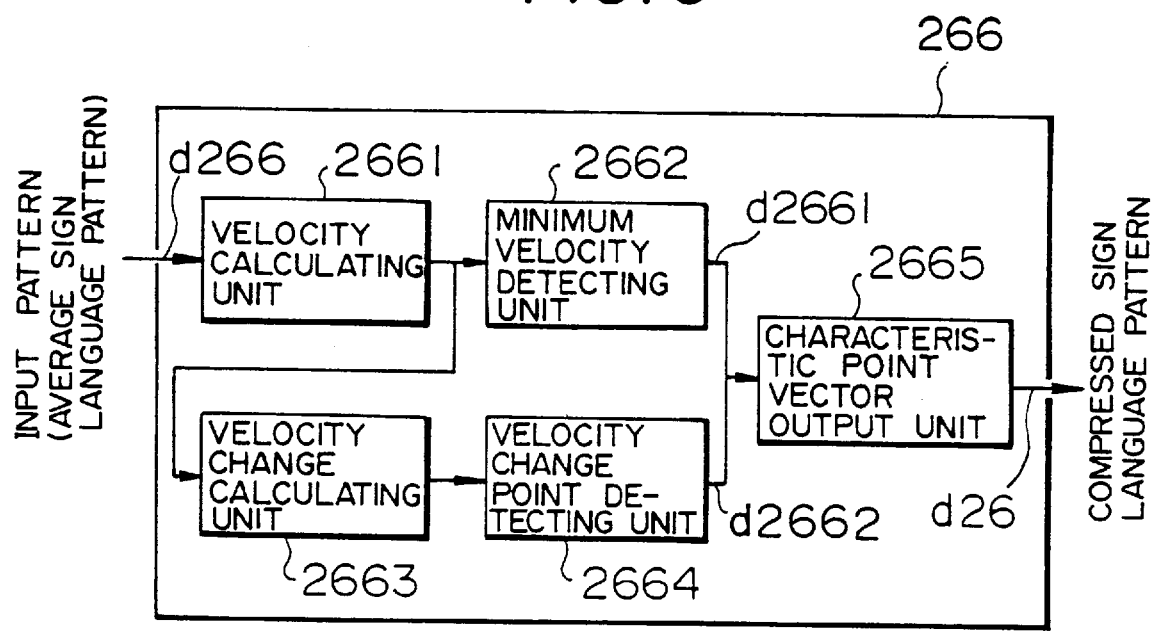
FIG. 5 is a diagram showing the structure of a pattern compression unit 266 of the reference sign language pattern generating unit 26.

FIG. 5 is a block diagram of the pattern compression unit 266. Reference numeral 2661 represents a velocity calculating unit for calculating a velocity from the time sequence of vectors. Reference numeral 2662 represents a minimum velocity detecting unit for detecting a minimum value of calculated velocities. Reference numeral 2663 represents a velocity change calculating unit for calculating a change in the direction of the velocity. Reference numeral 2664 represents a velocity change time detecting unit for detecting a time when the direction of the velocity changes.

The pattern compression unit 266 compresses the inputted average sign language pattern d266 by detecting characteristic points of the inputted pattern. The velocity calculating unit 2661 calculates the velocity at each timing of the inputted pattern 266. The velocity of vector can be obtained by the following equation (1):

$$\vec{v}(t) = \vec{p}(t) - \vec{p}(t-1) \tag{1}$$

where $\vec{p}(t)$ is a pattern vector at time t, and $\vec{v}(t)$ is a velocity vector of the pattern at time t.

The velocity at each timing obtained by the equation (1) is inputted to the minimum velocity detecting unit 2662 and velocity change calculating unit 2663. The minimum velocity detecting unit 2662 detects the minimum velocity from the time sequence of inputted velocities, and outputs it as a characteristic point d2661. Namely, the velocity calculating unit 2661 and minimum velocity detecting unit 2662 detect a kind of "pause".

The velocity change calculating unit 2663 calculates a change angle of the direction of the velocity vector. The change angle of the direction of the velocity vector can be obtained by the following equation (2):

$$\theta(\vec{v}(t), \vec{v}(t+1)) = \arccos \frac{\vec{v}(t) \cdot \vec{v}(t+1)}{|\vec{v}(t)||\vec{v}(t+1)|} \tag{2}$$

where $\theta(\vec{v}(t), \vec{v}(t+1))$ is an angle between velocity vectors $\vec{v}(t)$ and $\vec{v}(t+1)$.

Each change angle of the direction of the velocity vector is integrated by the velocity change point detecting unit 2664 which outputs a characteristic point d2662 at which the sum of change angles exceeds a predetermined threshold value. Namely, the characteristic point is represented by a time $T_j$ when the following inequality (3) is satisfied:

$$\sum_{t=T_i}^{T_j} \theta(\vec{v}(t), \vec{v}(t+1)) \geq \Theta \tag{3}$$

where $\Theta$ is a threshold value of the vector change angle. In this manner, such characteristic points are sequentially detected and outputted after the time $T_j$. The velocity change calculating unit 2663 and velocity change point detecting unit 2664 detect a kind of "locus".

Figure 6:
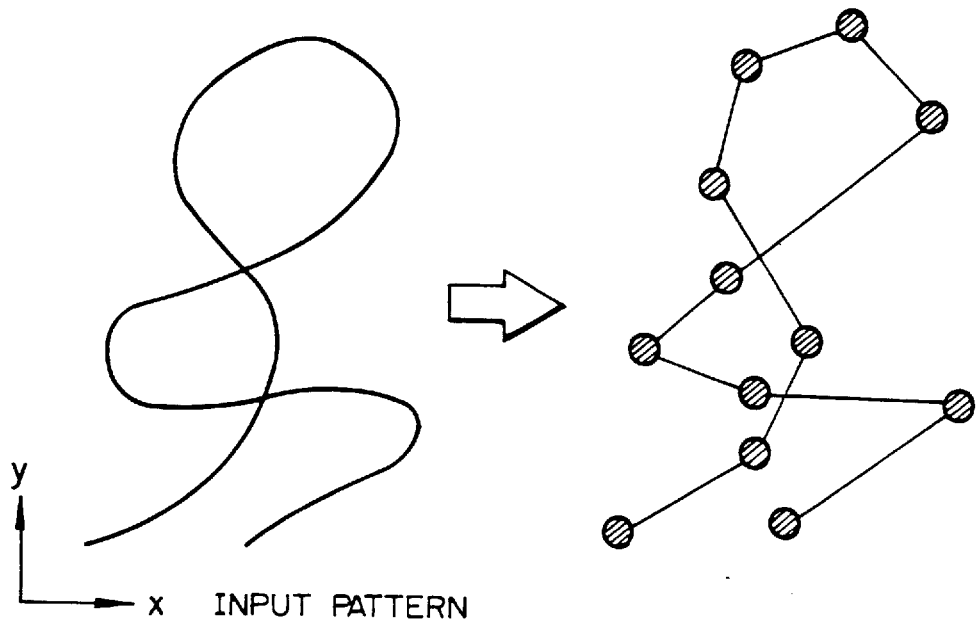
FIG. 6 is a diagram showing the manner how the input sign language pattern is compressed.

A characteristic point vector output unit 2665 outputs pattern vectors at the two characteristic points d2661 and d2662 and the time lengths between characteristic points, as a compressed sign language pattern d26. In this manner, the average sign language pattern is converted into the compressed sign language pattern as shown in FIG. 6. The compressed sign language pattern of each word is stored in the reference sign language pattern storage unit 27.

Figure 7:
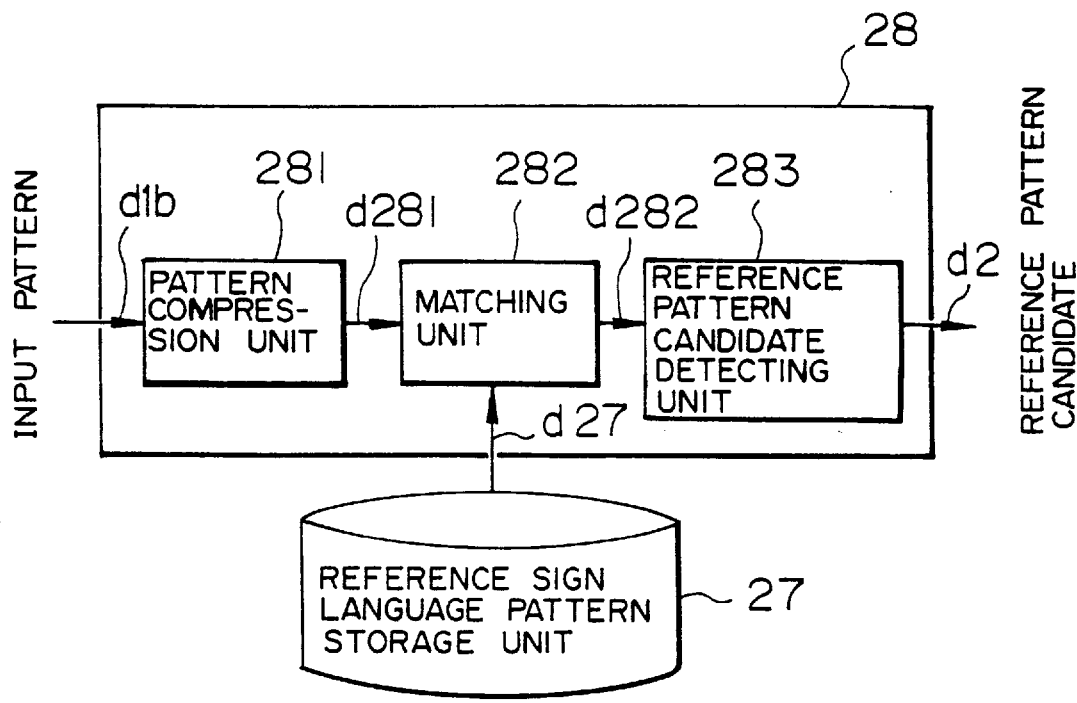
FIG. 7 is a block diagram of a continuous sign language recognition unit 28 of the sign language recognition unit 2.

FIG. 7 is a block diagram of the continuous sign language recognition unit 28. Reference numeral 281 represents a pattern compression unit, reference numeral 282 represents a matching unit for checking a matching between a continuous sign language pattern and reference sign language patterns, and reference numeral 283 represents a reference pattern candidate detecting unit for detecting a reference pattern candidate basing upon the match results by the matching unit 282.

A continuous sign language pattern inputted by a user is recognized while referring to compressed reference sign language patterns of respective words.

Figure 8:
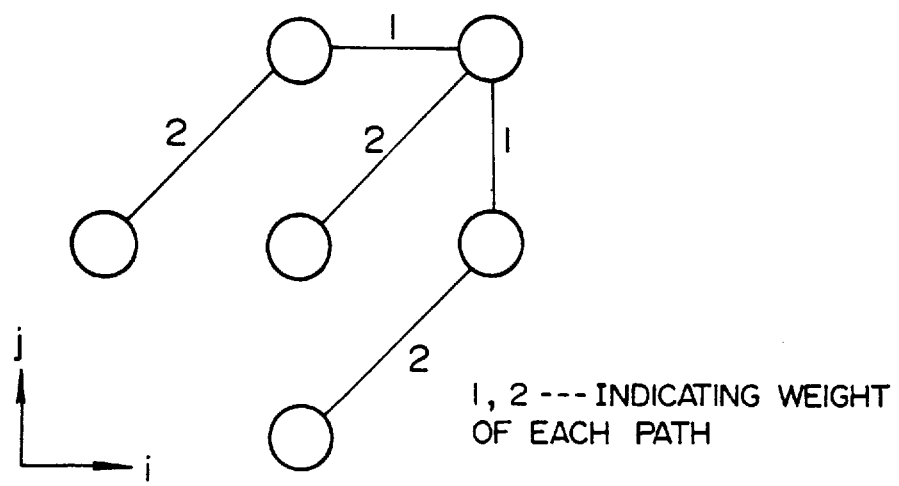
FIG. 8 is a diagram showing an example of DP path used by general continuous DP matching.
Figure 9:
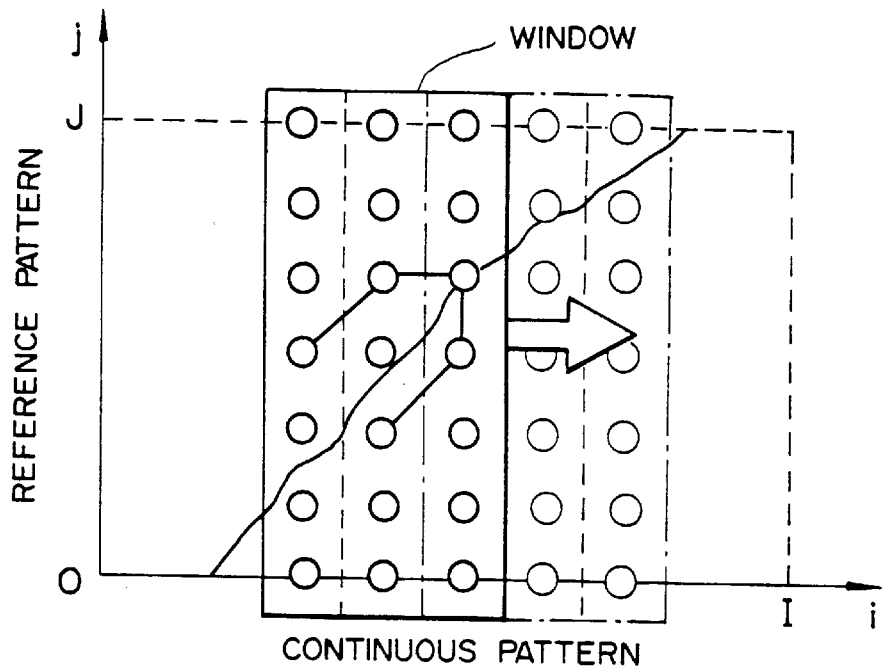
FIG. 9 is a diagram illustrating the principle of continuous DP matching.
Figure 10:
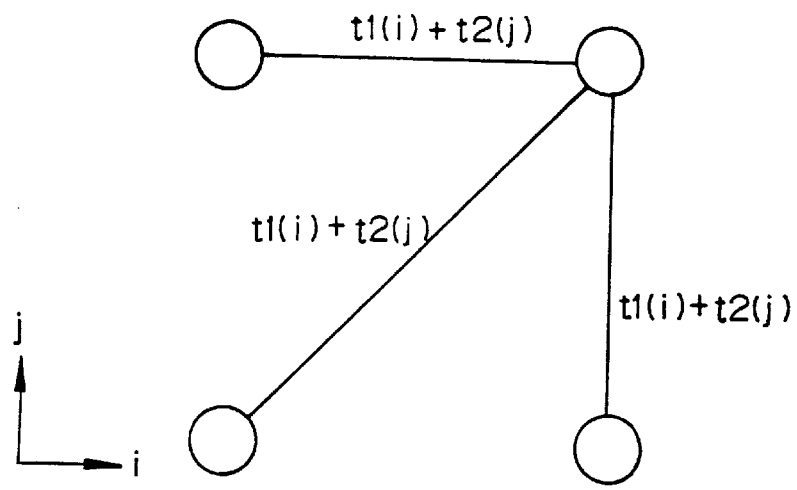
FIG. 10 is a diagram showing DP paths used in continuous DP matching of a compressed sign language pattern.

A continuous sign language pattern d1b inputted to the continuous sign language recognition unit 28 is compressed by the pattern compression unit 281. The pattern compression unit 281 is similar to the pattern compression unit 266 used by the reference sign language pattern generating unit 26. The matching unit 282 sequentially matches the compressed continuous sign language pattern with the compressed reference sign language patterns d27 by using a continuous DP scheme while nonlinearly changing the patterns in the time domain. A usual continuous DP scheme uses the restrictions (of, DP paths) such as illustrated in FIG. 8 for the vector correspondence between the continuous sign language pattern and reference sign language patterns. In this pattern matching, distances between vectors within a "window" shown in FIG. 9 are repetitively calculated while moving the window. Because patterns nonlinearly compressed in the time domain are directly matched, the restrictions and weights of DP paths shown in FIG. 10 are used. With such restrictions and weights, the correspondence between patterns even if they are nonlinearly compressed in the time domain can be checked. Furthermore, a time length between characteristic points is used as the weight at each path, so that the time length can be reflected upon the distance between corresponding characteristic points for the accumulated distance in the DP matching. However, the correspondence between characteristic points is took even if the difference between time lengths is too large, which may result in unnecessarily expanded/compressed time. From this reason, in addition to the above-described restrictions and weights, a distance corresponding to a ratio between time lengths is added. The distance between characteristic points is therefore given by the following equation (4):

$$d(i,j) = w_1 \times d_1(i,j) + w_2 \times d_2(i,j) \quad (4)$$

where $d_1(i,j)$ is a distance defined by the i-th characteristic point vector of the continuous pattern and by the j-th characteristic point vector of the reference pattern, $d_2(i,j)$ is a distance corresponding to a ratio between time lengths for the distance defined by the i-th characteristic point vector of the continuous pattern and by the j-th characteristic point vector of the reference pattern, and $w_1$ and $w_2$ are weights.

The distance between characteristic points of a vector is represented by a commonly used Euclidean distance. The distance may be defined by Mahalanobis distance or correlation coefficients. As the distance corresponding to a ratio between time lengths may be obtained from the following equation (5):

$$d_2(i,j) = \begin{cases} (r(i,j) - 1.0)^2; & r(i,j) \geq 1.0 \\ \left(\dfrac{1}{r(i,j)} - 1.0\right)^2; & r(i,j) < 1.0 \end{cases} \quad (5)$$

$$r(i,j) = \dfrac{\sum_{k=i_0}^{i} t_I(k)}{\sum_{k=j_0}^{j} t_J(k)}$$

where $t_I(k)$ is a time length at the k-th characteristic point of a continuous pattern, $t_J(k)$ is a time length at the k-th characteristic point of a reference pattern, $i_0$ is a start point of characteristic points of the continuous pattern corresponding to j, and $j_0$ is a start point of characteristic points of the reference pattern corresponding to i.

In the equation (5), if a characteristic point has a plurality of corresponding characteristic points, the ratio is calculated from the time lengths of all associated characteristic points. The equation (5) is defined by a function which makes the distance corresponding to the time length ratio become 0.0 when the time length ratio is 1.0. Other functions may be used which calculate the distance by using the ratio between time lengths at corresponding characteristic points.

Figure 11:
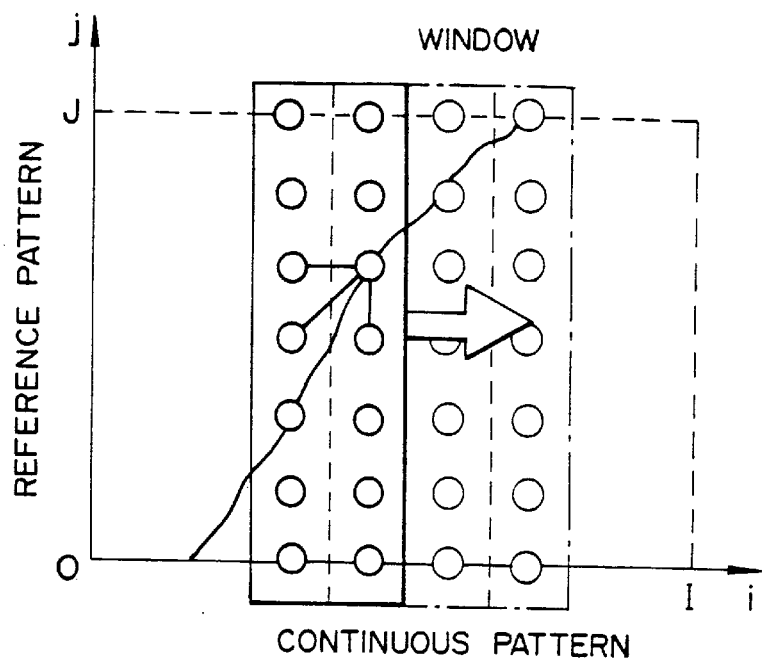
FIG. 11 is a diagram illustrating the principle of continuous DP matching of a compressed sign language pattern.

The continuous DP matching with the above-described DP paths and distance calculation is performed by sequentially moving the window shown in FIG. 11. This distance calculation is performed by the following asymptotic expansion equations:

$$D(i,J) = \dfrac{g(i,J)}{c(i,J)} \quad (6)$$

$$g(-1,j) = g(i,-1) = M \text{ (sufficiently large)}$$

$$g(i,0) = (t_{Ii} + t_{Jo}) \times d(i,0)$$

$$g_1(i,j) = g(i-1,j) + (t_{Ii} + t_{Jj}) \times d(i,j)$$

$$g_2(i,j) = g(i-1,j-1) + (t_{Ii} + t_{Jj}) \times d(i,j)$$

$$g_3(i,j) = g(i,j-1) + (t_{Ii} + t_{Jj}) \times d(i,j)$$

-continued $$g(i,j) = \begin{cases} g_1(i,j); \min\left\{\dfrac{g_1(i,j)}{c_1(i,j)}, \dfrac{g_2(i,j)}{c_2(i,j)}, \dfrac{g_3(i,j)}{c_3(i,j)}\right\} = \dfrac{g_1(i,j)}{c_1(i,j)} & (a) \\ g_2(i,j); \min\left\{\dfrac{g_1(i,j)}{c_1(i,j)}, \dfrac{g_2(i,j)}{c_2(i,j)}, \dfrac{g_3(i,j)}{c_3(i,j)}\right\} = \dfrac{g_2(i,j)}{c_2(i,j)} & (b) \\ g_3(i,j); \min\left\{\dfrac{g_1(i,j)}{c_1(i,j)}, \dfrac{g_2(i,j)}{c_2(i,j)}, \dfrac{g_3(i,j)}{c_3(i,j)}\right\} = \dfrac{g_3(i,j)}{c_3(i,j)} & (c) \end{cases}$$

$$c(-1,j) = c(i,-1) = 0$$

$$c(i,0) = t_{Ii} + t_{Jo}$$

$$c(i,j) = \begin{cases} c(i-1,j) + (t_{Ii} + t_{Jj}); \text{ for } (a) \\ c(i-1,j-1) + (t_{Ii} + t_{Jj}); \text{ for } (b) \\ c(i,j-1) + (t_{Ii} + t_{Jj}); \text{ for } (c) \end{cases}$$

where $d(i,J)$ is an accumulated distance at the i-th characteristic point of the continuous pattern relative to the reference pattern, $t_{Ii}$ is a time length at the i-th characteristic point of the continuous pattern, and $t_{Jj}$ is a time length at the j-th characteristic point of the reference pattern.

Figure 12:
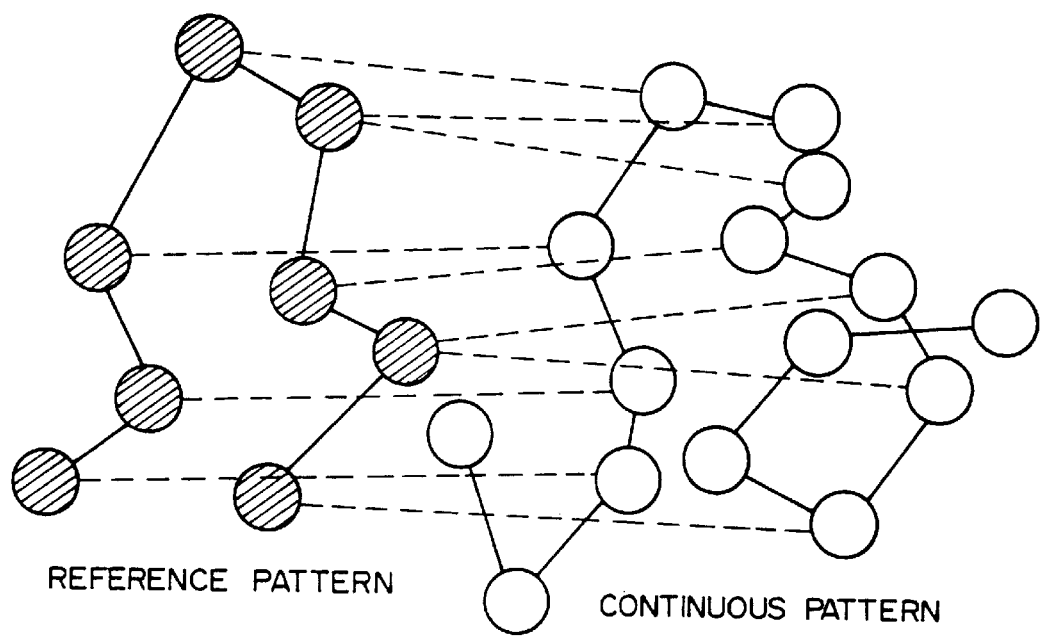
FIG. 12 is a diagram illustrating the correspondence between characteristic points by continuous DP matching.

A correspondence between characteristic points such as shown in FIG. 12 is obtained by the above-described pattern matching.

By the continuous DP matching, the accumulated distance d282 at each characteristic point is obtained for each reference sign language pattern. The reference pattern candidate detecting unit 283 obtains a minimum value of accumulated distances smaller than a predetermined threshold, the point of the minimum value being detected as the position of the reference pattern candidate. The reference pattern candidate detecting unit 283 outputs as a reference pattern candidate d2 the detected reference pattern, and its start and end points and accumulated distance.

The data gloves 1 and interface unit 1' of the first embodiment may be replaced by a different type of devices so long as they can convert a sign language into a time sequential continuous pattern of n-th order vector. For example, sign language data picked up by a television camera and converted into time sequential data of n-th order vector may also be used.

In the first embodiment, a sign language is recognized. However, the reference pattern generating method, pattern compressing method, pattern matching method, of the invention may also be used for the speech recognition, pen-inputted character recognition, moving image motion recognition, and the like.

For the speech recognition, generally used as recognition parameters is a time sequence of a plurality of frequency components obtained by the Fourier transformation or from a band pass filter. The frequency components change with time in the manner similar to the n-th order sign language pattern. Therefore, the above-described reference pattern generating method and pattern recognition method can be used. For the pen-inputted character recognition, the input data can be considered as n-th order time sequential data representing the coordinates and pressures of a pen. It is therefore possible to use the above-described reference pattern generating method and pattern recognition method. Also for the moving image motion recognition, the above-described methods can be used because the time sequential data of the coordinates of a position of an object can be obtained from the moving image.

Figure 13:
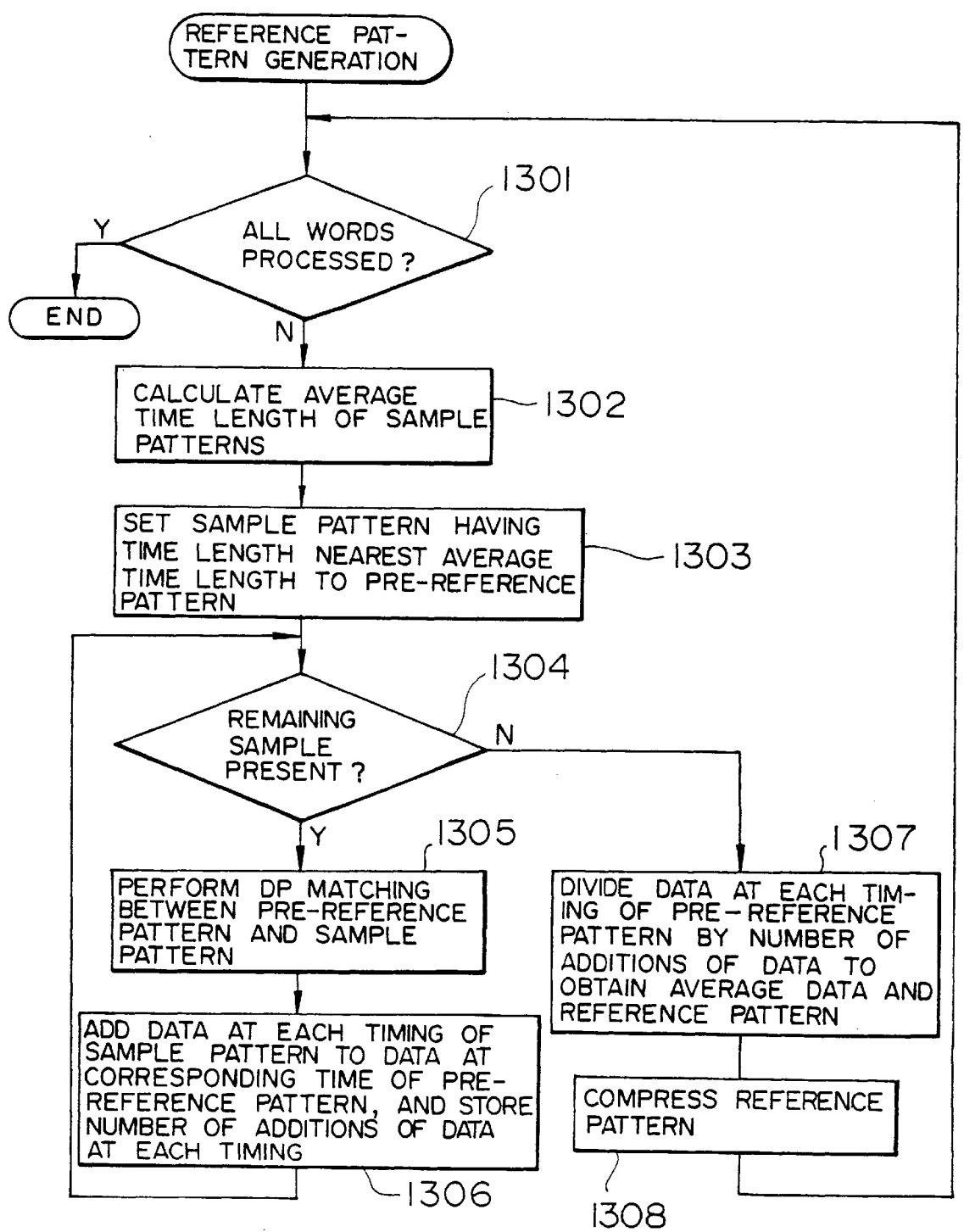
FIG. 13 is a flow chart illustrating the operation of reference pattern generation.
Figure 14:
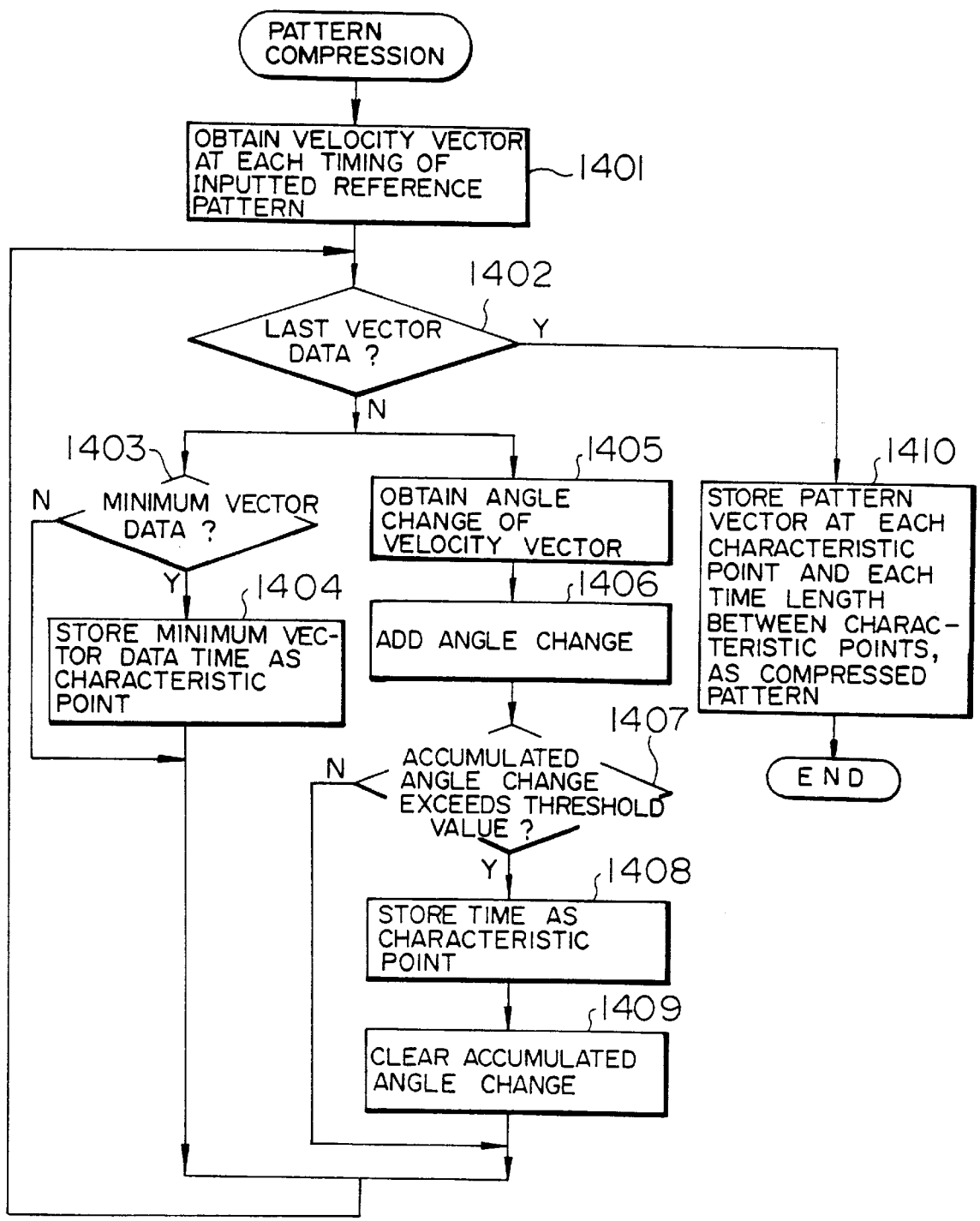
FIG. 14 is a flow chart illustrating the operation of a pattern compression process.
Figure 15:
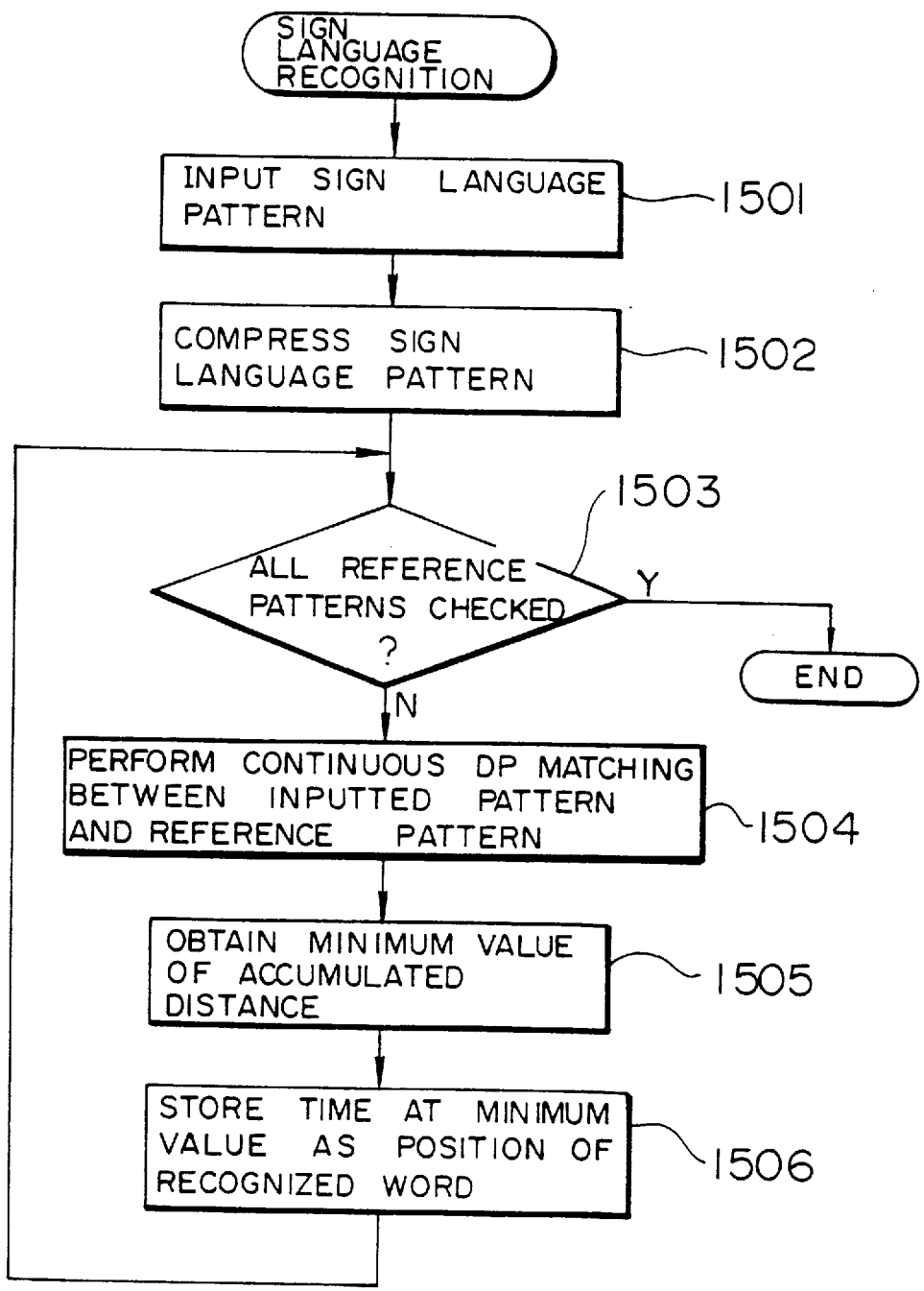
FIG. 15 is a flow chart illustrating the operation of a sign language recognition process.

Although the first embodiment is realized by hardware, software may be used. In this case, the reference sign language pattern generating unit, reference sign language pattern storage unit, and continuous sign language recognition unit may be realized flexibly by different computers or by a single computer. FIGS. 13 to 15 are flow charts illustrating the operation of the reference pattern generating method and sign language recognition method realized by software.

FIG. 13 is a flow chart illustrating the operation of the reference pattern generating unit. At Step 1301, it is checked whether the reference pattern generating process has been completed for all sign language words for which the reference patterns are to be generated. If completed, the operation is terminated. If not, an average of time lengths of sample patterns of a sign language word is calculated at Step 1302. At the next Step 1303, a sample pattern having a time length nearest the average time length is searched and stored as a pre-reference pattern. At Step 1304 it is checked whether the processes at Steps 1305 and 1306 have been performed for all the remaining sample patterns. If not, at Step 1305 the DP matching with the fixed start and end points between the pre-reference pattern and a sample pattern is executed. At Step 1306, data at each timing of the sample pattern is added to the data at the corresponding time of the pre-reference pattern in accordance with the DP matching results, and the number of data added to the data at the corresponding time is stored. If all the sample patterns have been completed at Step 1304, an average of added data at each timing of the pre-reference pattern is calculated. At Step 1308, the averaged pattern is compressed to use it as a reference pattern.

FIG. 14 is a flow chart illustrating the operation of the pattern compression unit. At Step 1401, the velocity vector at each timing is obtained from the input reference pattern, by using the equation (1). At Step 1402 it is checked whether the processes at Steps 1403 to 1409 have been completed for all the timings of the inputted reference pattern. If not, the processes at Steps 1403 and 1404, and the processes from Step 1405 to Step 1409, are executed. At Step 1403 it is checked whether the velocity vector at that time takes a minimum value. If minimum, the time is stored as a characteristic point at Step 1404 and the flow returns to Step 1402. If not minimum, the flow directly returns to Step 1402. At Step 1405, an angle change of velocity vectors at that time and at the preceding time is obtained, by using the equation (2). At the next Step 1406, the angle change at this time is added to the accumulated angle value at the preceding time. At Step 1407, it is checked whether the accumulated value of the angle change has exceeded a threshold value, by using the inequality (3). If in excess of the threshold value, the time is stored as a characteristic point at Step 1408. At the next Step 1409, the accumulated angle change value is cleared to prepare for obtaining the next characteristic point, and the flow returns to Step 1402. In the above operations, returning to Step 1402 is performed only when the processes at Steps 1403 and 1404 and the processes from Step 1405 to Step 1409 are both completed. If it is judged at Step 1402 that the inputted reference pattern has been processed for all the timings, a pattern vector at each characteristic point and a time length between characteristic points are obtained and stored as a compressed pattern at Step 1410.

FIG. 15 is a flow chart illustrating the operation of the sign language recognition unit. At Step 1501 a sign language pattern is inputted. The inputted sign language pattern is compressed at Step 1502. It is checked at Step 1503 whether the processes from Step 1504 to Step 1506 have been completed for all stored reference patterns. If there is any reference pattern still not checked, a continuous DP matching is performed between the inputted continuous sign language pattern and the reference pattern at Step 1504, by using the equations (4) to (6). At Step 1505, a minimum value of the accumulated distance is obtained from the time sequential data of the accumulated distance calculated by the DP matching. The time corresponding to the minimum value is stored as the position of the recognized word, and the flow returns to Step 1503. If it is judged at Step 1503 that all the reference patterns have been checked, the sign language recognition process is terminated.

According to the first embodiment described above, an excellent reference sign language pattern can be generated by calculating an average of sample sign language patterns based on a correspondence relation obtained through the DP matching, without damaging the characteristic feature of a sign language which might otherwise be damaged by non-linear expansion/compression in the time domain. Furthermore, a general sign language having a series of motions of fingers and hands can be continuously recognized by the continuous DP matching between continuous sign language patterns and reference sign language patterns. Still further, characteristic points of reference sign language patterns and continuous sign language patterns are derived therefrom, and the patterns are compressed in accordance with the characteristic points. It is therefore possible to efficiently compress sign language patterns, and to recognize sign language patterns at high speed through a direct matching between compressed sign language patterns.

Next, the second embodiment of the present invention will be described.

The second embodiment which basically uses the continuous DP matching of the first embodiment provides a sign language translation system intended for use by a plurality of different users. This system is an integrated total system for sign language translation wherein not only sign language is inputted from data gloves but also the portrait of a sign language user is inputted to provide the facial expression.

The second embodiment of the invention will be described in detail with reference to FIGS. 16 to 24. First, referring to FIG. 16, the overall structure of a sign language translation system 100 and the function and data transfer at each element will be described. This system is broadly divided into eight sections, including a sign language recognition section (1, 2, 3), a look recognition section (4, 5), a data input/output section (6, 7), a speech recognition section (9, 10), a keyboard section (8), a display section (13, 14, 15), a voice generating section (11, 12), a processor (computer) section (16).

The operation of the sign language system when used between a sign language user and another person will first be described. In order to translate a sign language given by a sign language user, time sequential information (d1) representing the shapes of fingers and the directions and positions of hands of the sign language user is sent from data gloves 1 to a sign language recognition unit 2 via an interface unit 1'. The sign language recognition unit 2 dynamically matches the time sequential information d1 with sign language word dictionary data to transform the words contained in the information (d1) into symbolized words (d2). A spoken language translation unit 3 converts the sequentially inputted symbolized words (d2) into a spoken language (d3) by supplementing proper particles and the like between words.

In addition to the above, the portrait (d4) of the sign language user is picked up by a TV camera 4. A look recognition unit 5 recognizes the look or emotion (smiling, sad, and etc.) of the face and outputs the degree (d5) of emotion.

If voices are used for the translation output medium, the data (d3 and d5) are supplied to the computer 16 and converted into a spoken language (d12) added with simple emotion-representing adjectives or into voice synthesizing parameters (d12) which are then sent to a voice synthesizing unit 12. In accordance with the converted data (d12), the voice synthesizing unit 12 synthesizes voices having the emotion (d5) corresponding to the spoken language (d3).

If texts are used for the translation output medium, the data (d3 and d5) supplied to the computer 16 are converted into a spoken language (d123) added with simple emotion-representing adjectives, and sent to a monitor 13 to display a text.

If other sign languages are used for the translation output medium, the computer 16 derives words (d14) from the spoken language (d3) added with simple emotion-representing adjectives, and sends them to a sign language CG generating unit 14 to display corresponding sign language words on the monitor 13.

Another person understood the translation output supplied from the translation output medium communicates by using a keyboard 8, a microphone 9, or data gloves 1 (which may be provided at another sign recognition section). For the text conversation, a text (d8) is inputted from the keyboard 8 and displayed on the monitor 13. Alternatively, a text (d8) constituted by only simple words is inputted from the keyboard 8, and converted into corresponding sign language words by the sign language CG generating unit 14 to display them on the monitor 13.

For the voice conversation using the microphone 9, voice data for each word is recognized and converted into symbolized words (d9) by a voice recognition unit 10. The symbolized words are displayed on the monitor 13 in the form of text, or alternatively in the form of corresponding sign language words converted by the sign language CG generating unit 14. For the sign language conversation using the data gloves 1, the sign language is outputted as voices, texts, or sign language words, in the manner described previously.

The computer 16 controls the entirety of the processor section and performs simple data conversion. The voice recognition unit 10 and voice synthesizing unit 12 can be easily realized by using already developed techniques (e.g., "Auditory Sense and Voices", The institute of Electronics and Communication Engineers, compiled by Tanetoshi MIURA, 1980).

Figure 16:
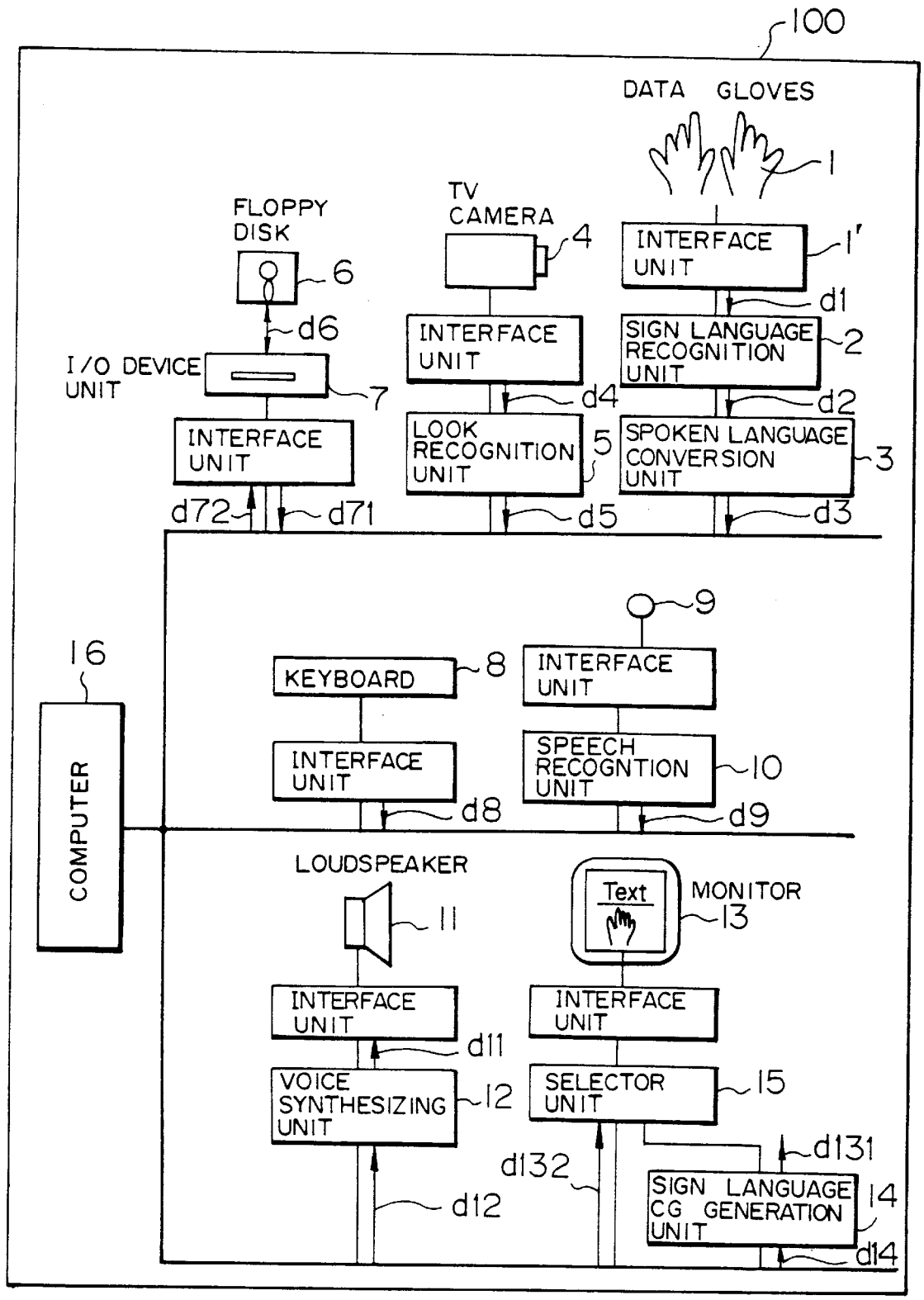
FIG. 16 is a diagram showing the whole structure of a sign language translation system 100.

In the following, the details of the sign language recognition section (1, 2, 3), look recognition section (4, 5), and data input/output section (6, 7) shown in FIG. 16 will be given.

Figure 17:
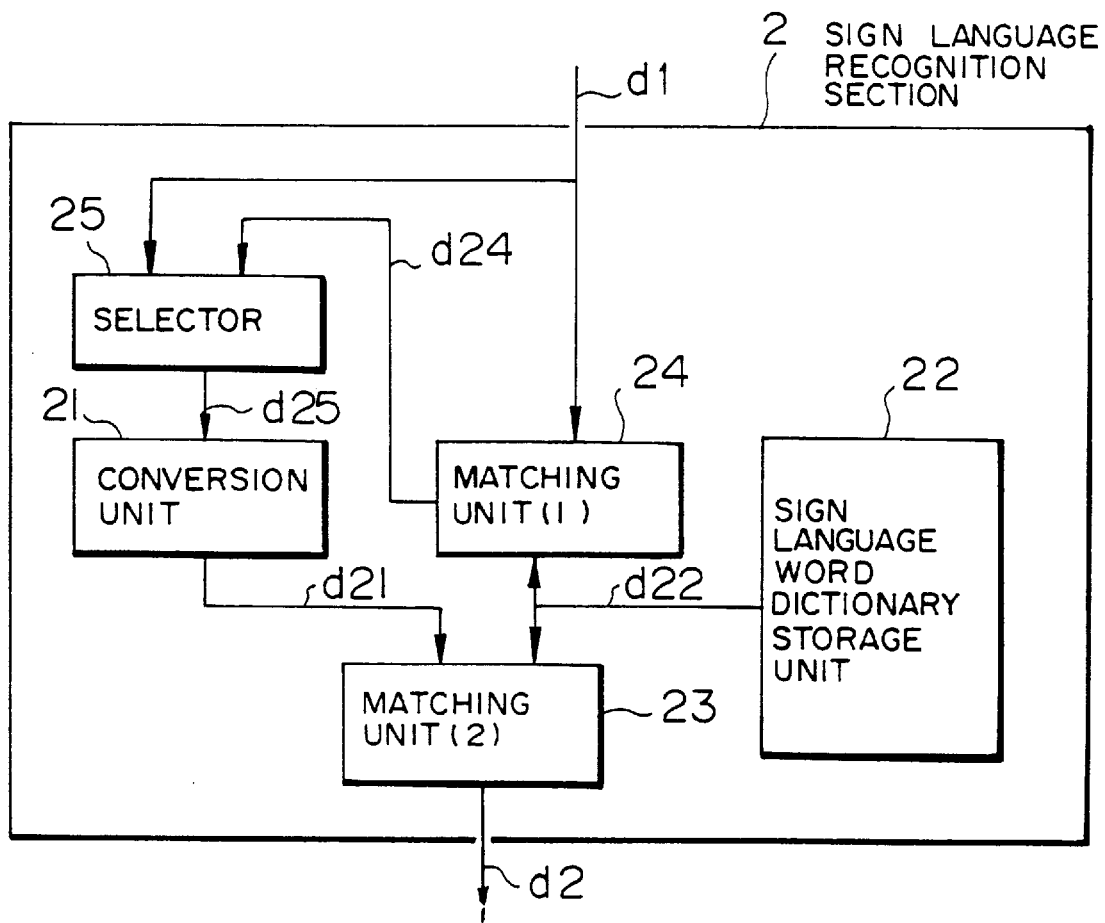
FIG. 17 is a diagram showing a sign language recognition unit 2 according to the second embodiment.

FIG. 17 shows the detailed structure of the sign language recognition unit 2. The functions of the recognition unit 2 include:

Function (1): It is assumed that sign language word data of a first sign language user (or sign language word data common to a plurality of sign language users) has already been registered in a dictionary. Prior to using the sign language of a second sign language user, sign language word data of the second sign language user is picked up from data gloves for a predetermined number of words. The sign language word data of each word is compared with the corresponding data in the sign language word dictionary, and is calibrated to compensate for a personal difference between sign language data, i.e., to make the sign language data of the second sign language user more similar to that of the first sign language user. This calibration is executed only at the set-up of the system.

Function (2): Time sequential sign language word data of the second user after the calibration is dynamically matched with the sign language word dictionary data of the first user to recognize words contained in the time sequential data. Function (2) basically uses the continuous DP matching described with the first embodiment.

The operation of realizing Function (1) will be described.

The second sign language user inputs one sign language word d1 after another among the predetermined words to a matching unit (1) 24. The corresponding sign language word dictionary data d22 is read from a sign language word dictionary storage unit 22 and inputted to the matching unit (1) 24. The matching unit (1) 24 performs a start/end point fixed dynamic matching. The sign language word dictionary storage unit 22 corresponds to the reference sign language pattern storage unit 27 of the first embodiment, and is assumed that reference sign language patterns of the first user (or patterns common to a plurality of users) are stored in correspondence with respective sign language words.

Figure 19:
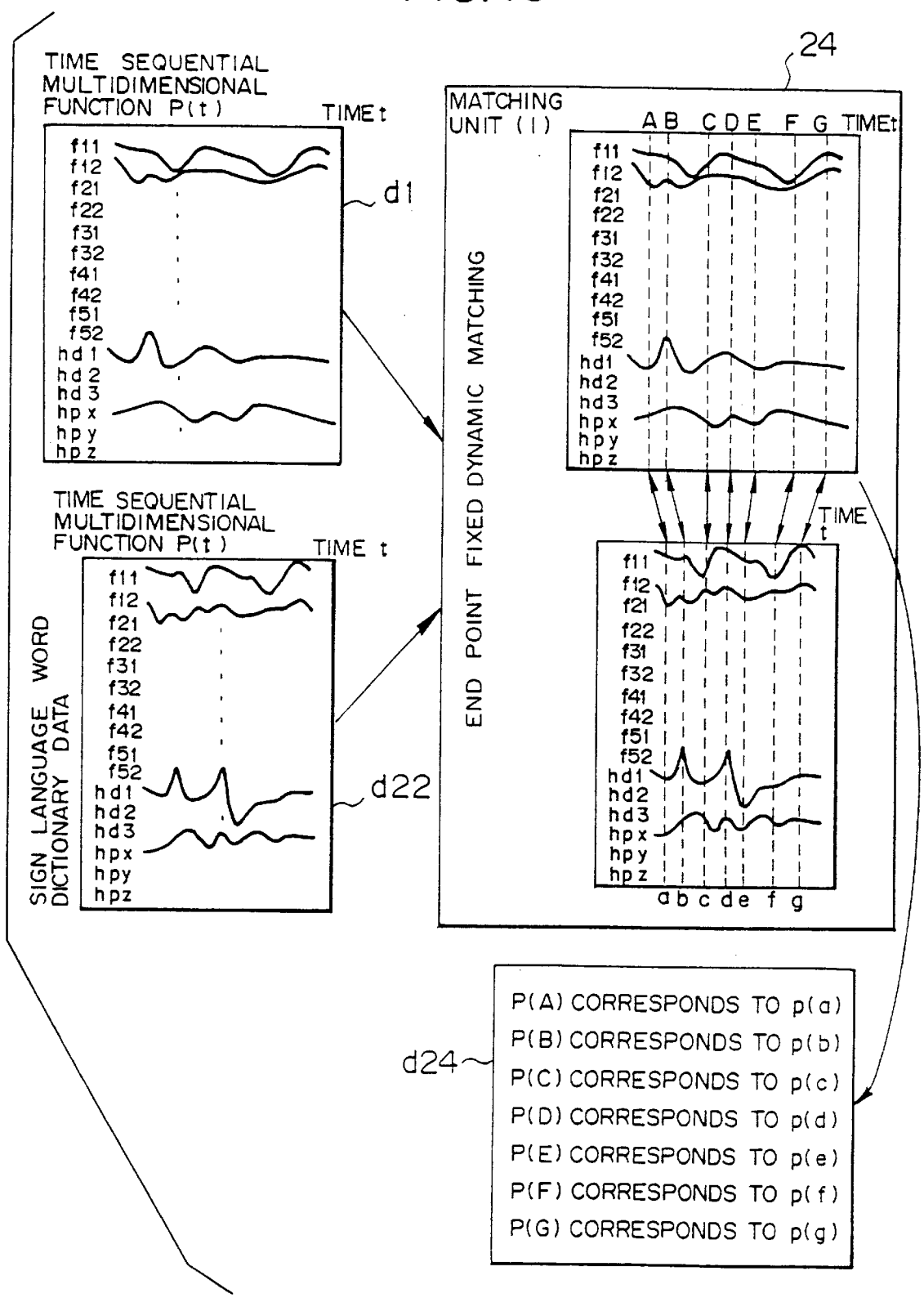
FIG. 19 is a diagram explaining the operation of a matching unit (1) 24 of the sign language recognition unit 2.

Different from general finger spellings, a sign language word is represented by the motion of fingers and hands. Therefore, as shown in FIG. 19, the data obtained from the data gloves 1 is represented by a time sequential multidimensional function P(t) (a function formed by a number of one-dimensional functions) of f11 to f52, hd1 to hd3, and hpx to hpz. Functions f11 to f52 represent the angles of finger articulations (e.g., f11 represents the finger angle at the first articulation of a thumb, f12 represents the finger angle at the second articulation of the thumb, and f21 to f52 represent the finger angles at the first and second articulations of the other fingers). Functions hd1 to hd3 represent the directions of the palm of a hand, and functions hpx to hpz represent the position of the hand.

The sign language word dictionary data for each word is represented in a similar manner by a time sequential multidimensional function p(t).

The time sequential data only for one hand is shown in FIG. 19 for the purpose of simplicity. In practice, data for both hands is used so that the dimension of the function is doubled.

As shown in FIG. 19, there is certainly a personal difference between the inputted sign language word data of the second user and that of the first user (or average person). To absorb such difference, it is necessary to convert the inputted sing language word data of the second user into corresponding data of the first user. To this end, a start/end point fixed dynamic matching is first executed to obtain optimum correspondence points therebetween.

The start/end point fixed dynamic matching is a kind of dynamic template matching wherein the start and end points of the input data and dictionary data are fixed while the other points are allowed to be moved in the time domain. This dynamic matching may use a known technique (refer to "Pattern Recognition and Learning Algorithms" by Yoshinori KAMISAKA and Kazuhiko OZEKI, Bunichi Sogo Shuppan, p.91).

Several sample words are subject to this matching to obtain correspondence information d24 such as shown in FIG. 19. The information d24 is correspondence data between the input data of the second user and the dictionary data of the first user, and includes as shown in FIG. 19 data P(A), P(B), P(C), P(D), P(D), P(E), P(F), P(G), . . . and p(a), p(b), p(c), p(d), p(e), p(f), p(g), . . .

Returning back to FIG. 17, reference numeral 25 represents a selector unit. When Function (1) is to be realized, the selector unit 25 does not select data d1, but selects the correspondence data d24 and sends it to a conversion unit 21.

Figure 18:
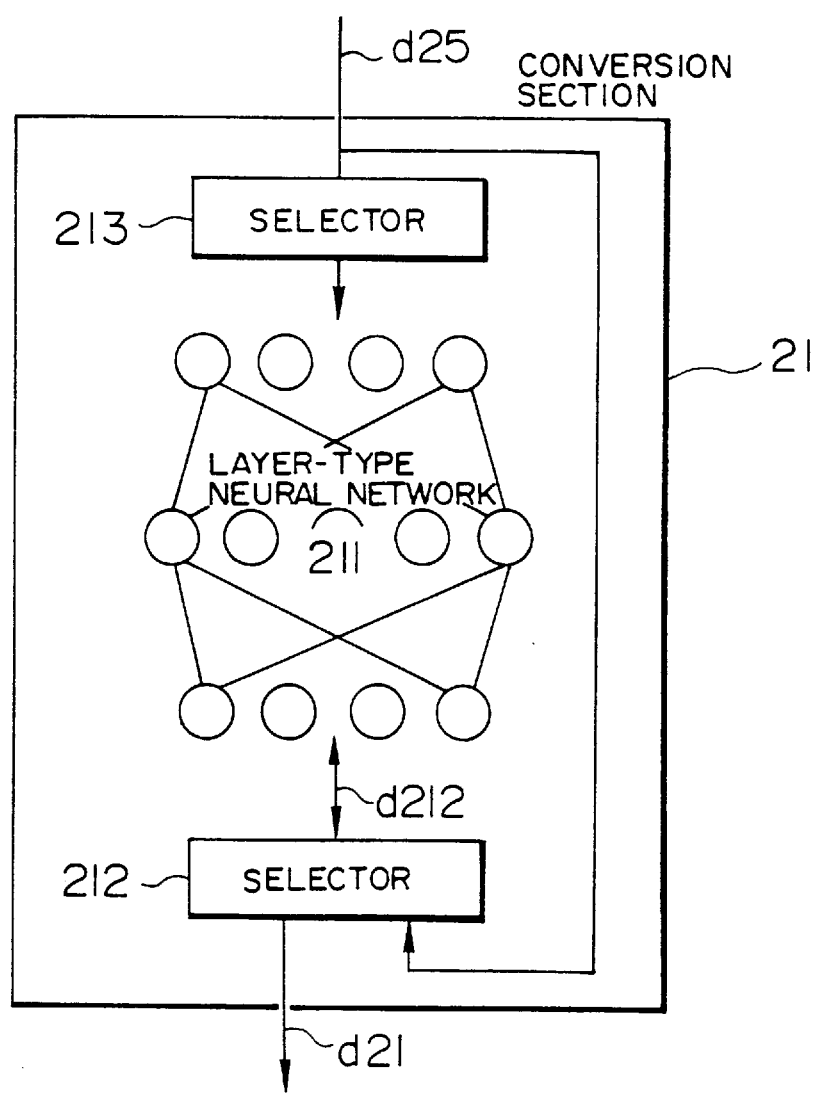
FIG. 18 is a diagram showing the structure of a conversion unit 21 of the sign language recognition unit 2.

As shown in FIG. 18, the conversion unit 21 includes a layer-type neural network 211 and selectors 212 and 213. In the conversion unit 21, the selector 213 selects the data P(A), P(B), P(C), P(D), P(E), P(F), P(G), . . . from the inputted data d25 and inputs them to the neural network 211, and the selector 214 uses the data p(a), p(b), p(c), p(d), p(e), p(f), p(g), . . . as the learning data d212 of the neural network 211.

The leaning of the neural network 211 is made by using the several sample data d25 to obtain weight coefficients of the neural network 211 which define the rule of conversion from the time sequential data P(t) of the second user to the dictionary data p(t) of the first user.

The operation of realizing Function (2) will be described.

In realizing Function (2), the selector unit 25 shown in FIG. 17 selects the data d1, inputs it as the data d25 to the selector 213 shown in FIG. 18. The data d25 selected by the selector 213 is supplied to the neural network 211, and the selector 212 selects the output of the neural network 211 as the data d212 which is outputted as the data d21.

The inputted sign language time sequential data dl of the second user is a time sequence of words of a sign language, different from the above-described calibration. The time sequential data d1 of the second user is converted by the learnt layer-type neural network 211 into time sequential data d21 with the personal difference being removed. As described previously, this converted time sequential data d21 is similar to the dictionary data of the first user because of Function (1) provided by the neural network 211.

Another matching unit (2) 23 shown in FIG. 17 matches the converted time sequential data d21 with the dictionary data to detect a train of words included in the sign language time sequential data d21.

The operation of the matching unit (2) 23 will be described with reference to FIG. 20, the fundamental operation being the same as the first embodiment.

Figure 20:
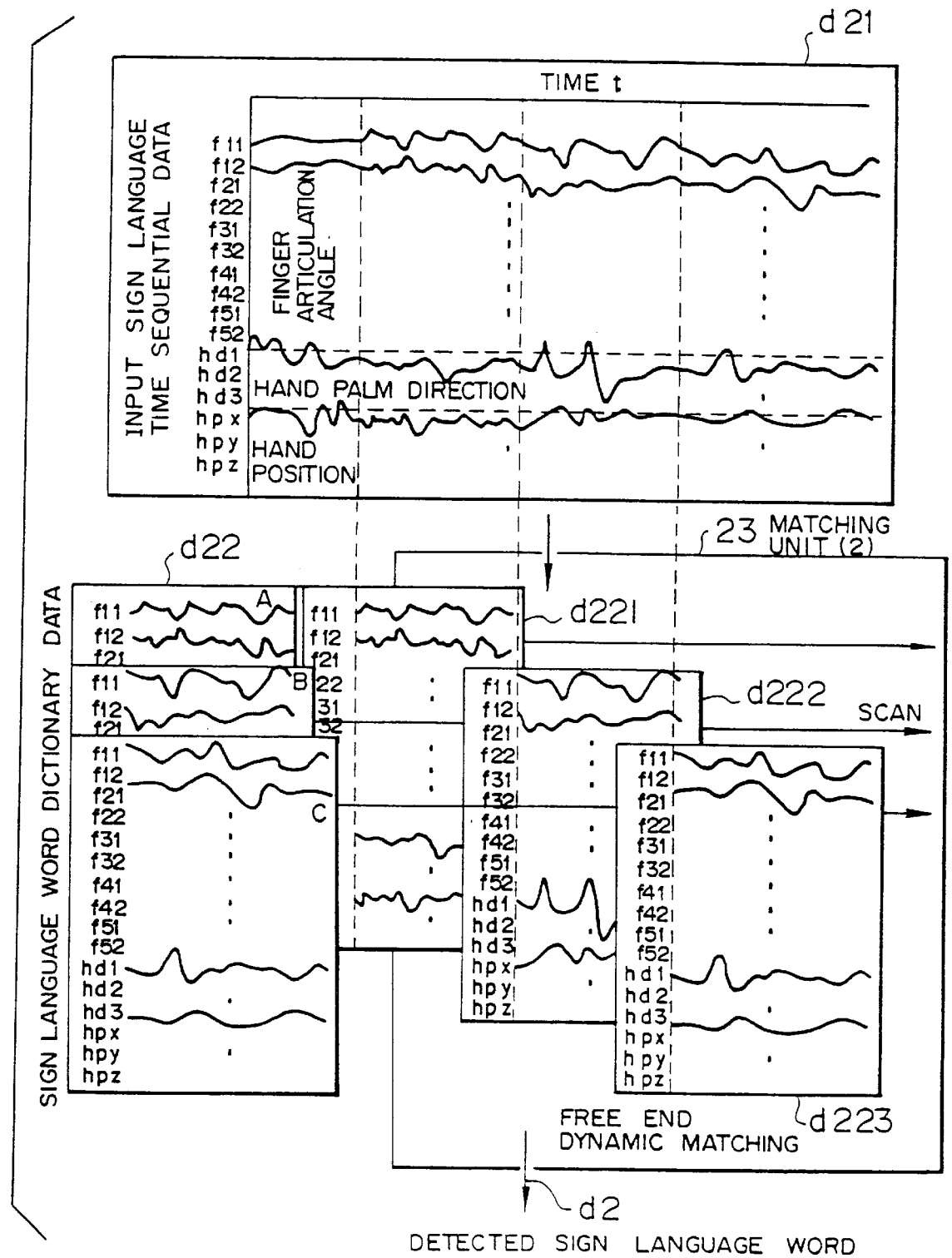
FIG. 20 is a diagram explaining the operation of a matching unit (2) 23 of the sign language recognition unit (2) 23.

In FIG. 20, d21 represents the inputted sign language time sequential data, and d22 represents the sign language word dictionary data. The inputted time sequential data d21 is represented by a function of a multidimensional time t as described previously. The sign language word dictionary data d22 includes, for example as shown in FIG. 20, data A, B, C, . . . which are dynamically matched with the inputted time sequential data d21.

This dynamic matching is performed by using a method called a continuous DP matching scheme ("Continuous Word Recognition using Continuous DP", by OKA, the Speech Study Group of Acoustical Society of Japan, S78–20, pp.145 to 152, 1978).

The fundamental operation of this dynamical matching is to scan each sign language word dictionary data on the inputted sign language time sequential data to match the former with the latter at each timing, and to recognize a word in the latter at the position (timing) with the best similarity.

During the matching, expansion/compression is allowed to a certain degree in the time domain. The matching unit (2) 23 outputs time sequentially recognized words as data d2.

A spoken language conversion unit 3 adds dependent words such as articles, prepositions, particles, auxiliary verbs to the recognized words in accordance with the conversion rules, and outputs a symbolized language more similar to a spoken language, as disclosed in U.S. patent application Ser. No. 08/029046 filed Mar. 9, 1993.

Next, the details of the look recognition unit 5 will be described with reference to FIGS. 21 to 23.

Figure 21:
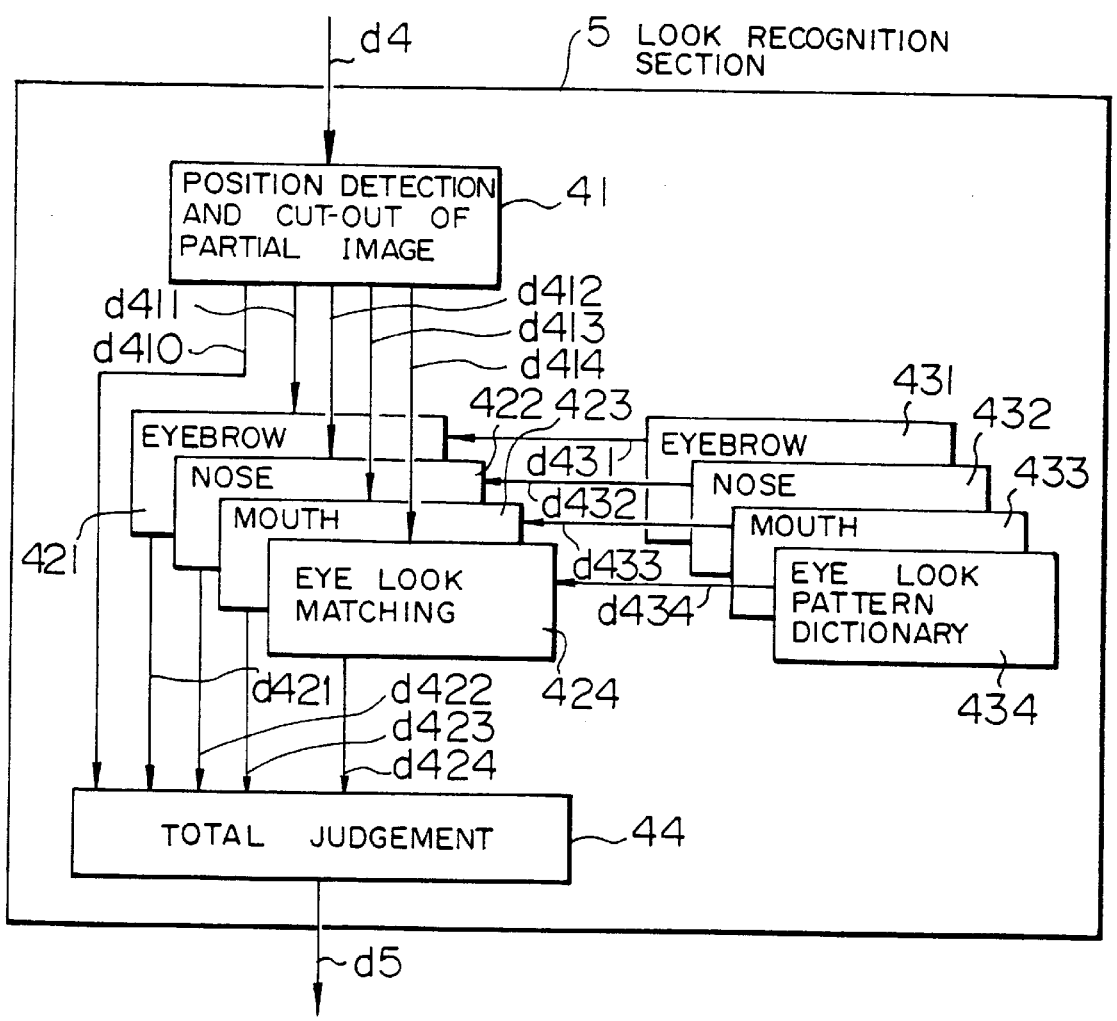
FIG. 21 is a diagram showing the structure of a look recognition unit 5.

FIG. 21 shows the detailed structure of the look recognition unit 5. An input d4 represents a portrait of a sign language user, and output d5 represents a type of emotion and a numerical degree of emotion (e.g., a delight degree of 60%, a grief degree of 10%).

A block 41 shown in FIG. 21 performs a position detection (d410) of the eyes, mouth, nose, and eyebrows of the portrait, and a cut-out of the eye image (d414), mouth image (d413), nose image (d412), and eyebrow image (d411).

Look matching units (424, 423, 422, 421) detect the emotion degrees of the partial images (d424, d423, d422, d421) while referring to the reference look pattern dictionaries (434, 433, 432, 431).

In accordance with these emotion degrees and the emotion degrees to be determined from the positions (d410) of the eye, mouth, nose, and eyebrows, the total judgement unit 44 totally determines the final emotion degree and type and outputs them.

Figure 22:
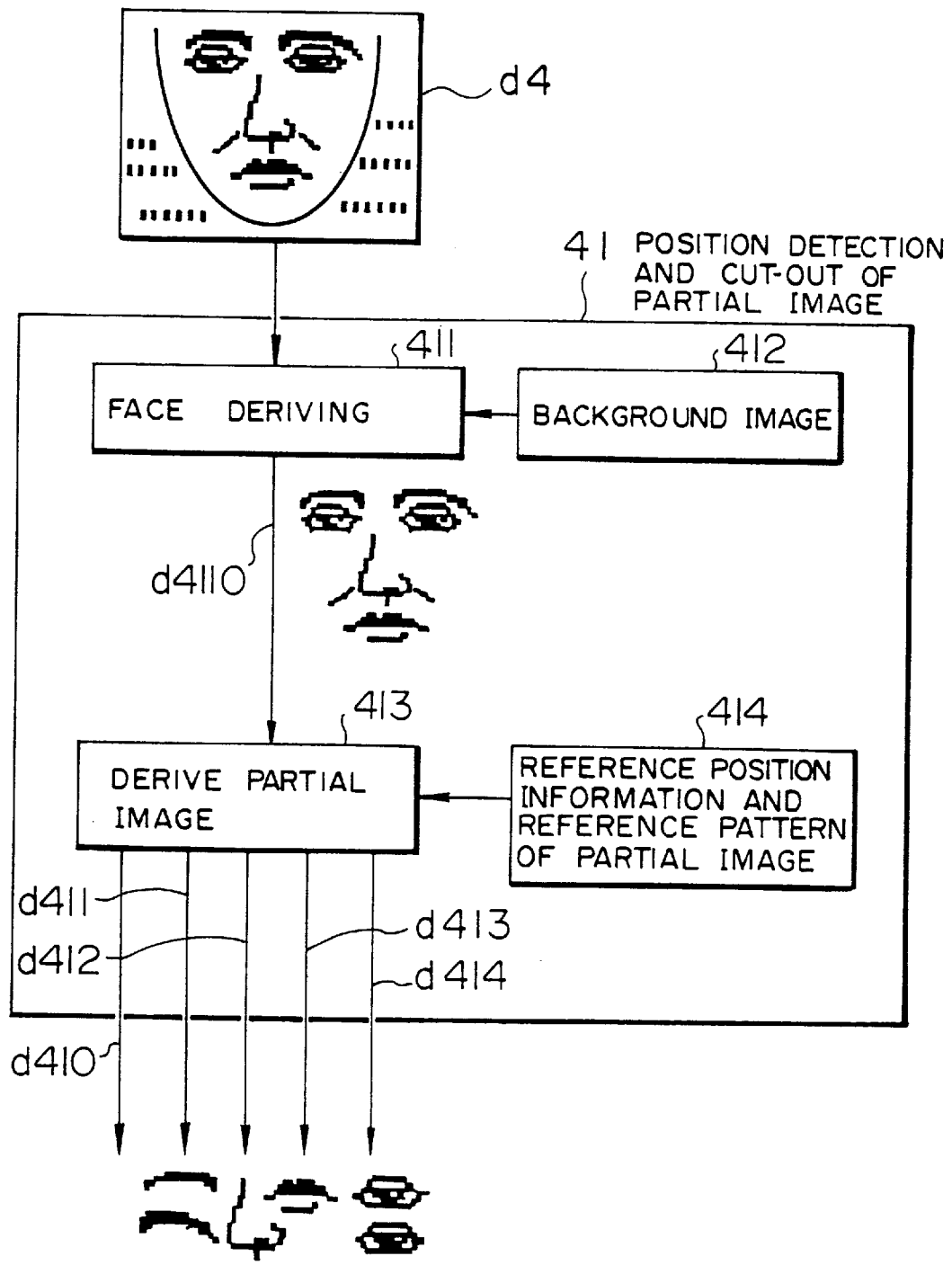
FIG. 22 is a diagram showing the structure of a partial image position detection and cut-out unit 41 of the look recognition unit 5.

FIG. 22 shows the details of the position detection and image cut-out.

A block 411 derives a face image d4110 without the background of the portrait by obtaining an absolute difference between a pre-registered background 412 and the input portrait d4.

A block 413 first detects the position and size of the total face image d4110 by using an image processing technique such as projection distribution.

The block 413 then detects the position of each partial image such as the eye image, mouth image, nose image, and eyebrow image, through a template matching between the total face image d4110 without background and each standard partial image pattern 414 which is used as a template, while referring to reference position information 414.

In this case, if the reference position information 414 is normalized by the position and size of the detected total face image d4110, the range of the area to be subject to the template matching can be narrowed, realizing an improved precision and efficiency of the matching.

Once the position of each partial image can be detected, the image can be cut out easily. An output d410 represents the position of each partial image, and d414, d413, d412, and d411 represent the eye image, mouth image, nose image, and eyebrow image respectively.

The method explained above is formulated as follows:

$$D_k(x, y) = \Sigma i \Sigma j \{G(x+i, y+j) - T_k(i, j)\}^2$$

where $T_k(i,j)$ is the template 414 for: an eyebrow (k=0), a nose (k=1), an eye (k=2) and a mouth (k=3); G(x, y) is an image corresponding to d4110. The $(x_{0k}, Y_{0k})$ at which $D_k(x, y)$ takes a minimum value is derived by calculating $D_k(x, y)$ for each value of k. Then a partial image around a position $(x_{0k}, y_{0k})$ in an input image is extracted for each value of k so that the partial image has the same size as a template corresponding to the image. The outputs d411, d412, d413 and d414 are the extracted partial images.

Figure 26:
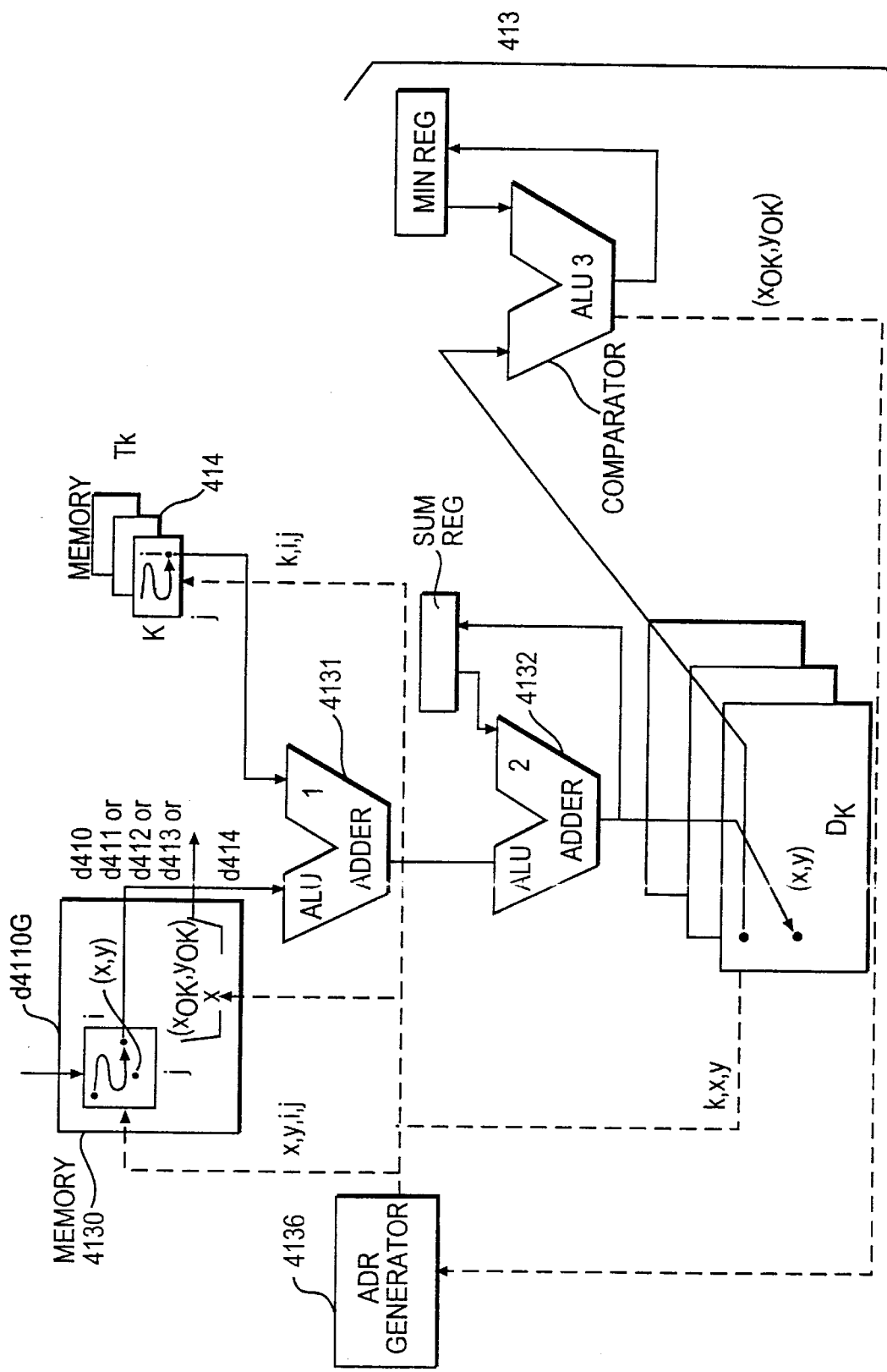
FIG. 26 is a diagram showing details of the look recognition section 5.

FIG. 26 shows an example of a hardware configuration for realizing the calculation of $D_k(x,y)$.

In FIG. 26, an input face image d4110 is stored in a memory 4130. A square error is calculated by ALU 1 and ALU 2 on the basis of the reference pattern $T_k$ stored in memory 414. Namely, face image data G(x+i, y+j) are successively read in accordance with an address generator 4136 while reference pattern data $T_k(i, j)$ are read in synchronism with the data G(x+i, y+j).

Then, a difference and the square of the difference are calculated in the ALU 1 4131 and a summation with respect to i and j is obtained in the ALU 2 4132. The result of the calculations, i.e. $D_k$, is stored in a memory address (x, y). Next, a coordinate of the minimum value of the image $D_k$ $(x_{0k}, y_{0k})$, i.e. a place nearest to the reference pattern $T_k$, is determined by ALU 3 (comparator) 4135, then a part of an original image corresponding to the coordinate ($x_{Ok}$, $y_{Ok}$) is outputted as d411, . . . or d414.

The above processing is performed with respect to each k, i.e. a part of a face. The output d410 is a position ($x_{Ok}$, $y_{Ok}$).

Figure 23:
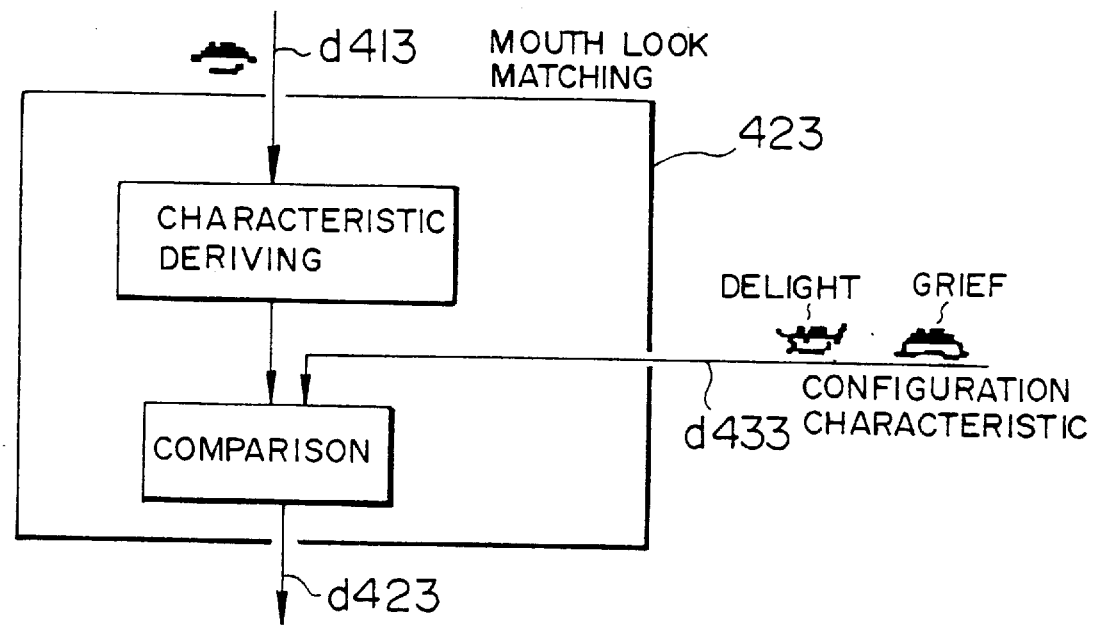
FIG. 23 is a diagram showing the structure of a look matching unit 423 of the look recognition unit 5.

FIG. 23 shows the detailed structure of the mouth matching unit 423 of the look recognition unit 5.

The mouth image d413 are compared with the pre-registered characteristics such as delighted mouth and sad mouth configurations (through comparison between distances on a configuration characteristic space) to determine the most similar configuration characteristic. Then, data d423 is outputted which represents the type of the emotion belonging to the determined most similar configuration characteristic and the emotion degree in inverse proportion to the distance on the configuration characteristic space.

The steps explained above are formulated as follows:

$$M_{kl} = \Sigma i \ \Sigma j \{G(x_{Ok}+i, y_{Ok}+j) - T_{kl}(i, j)\}^2$$

where $G(x_{Ok}, y_{Ok})$ is a detected partial image for k, and $T_{kl}(i, j)$ is a template d413 for emotion type l. For example, in case of k=3: l=0, l=1 and l=2 represent a delighted mouth, a normal mouth and an angered mouth, respectively.

This is, the above equation is prepared for calculating a distance $M_{kl}$ between different types of templates.

Figure 27:
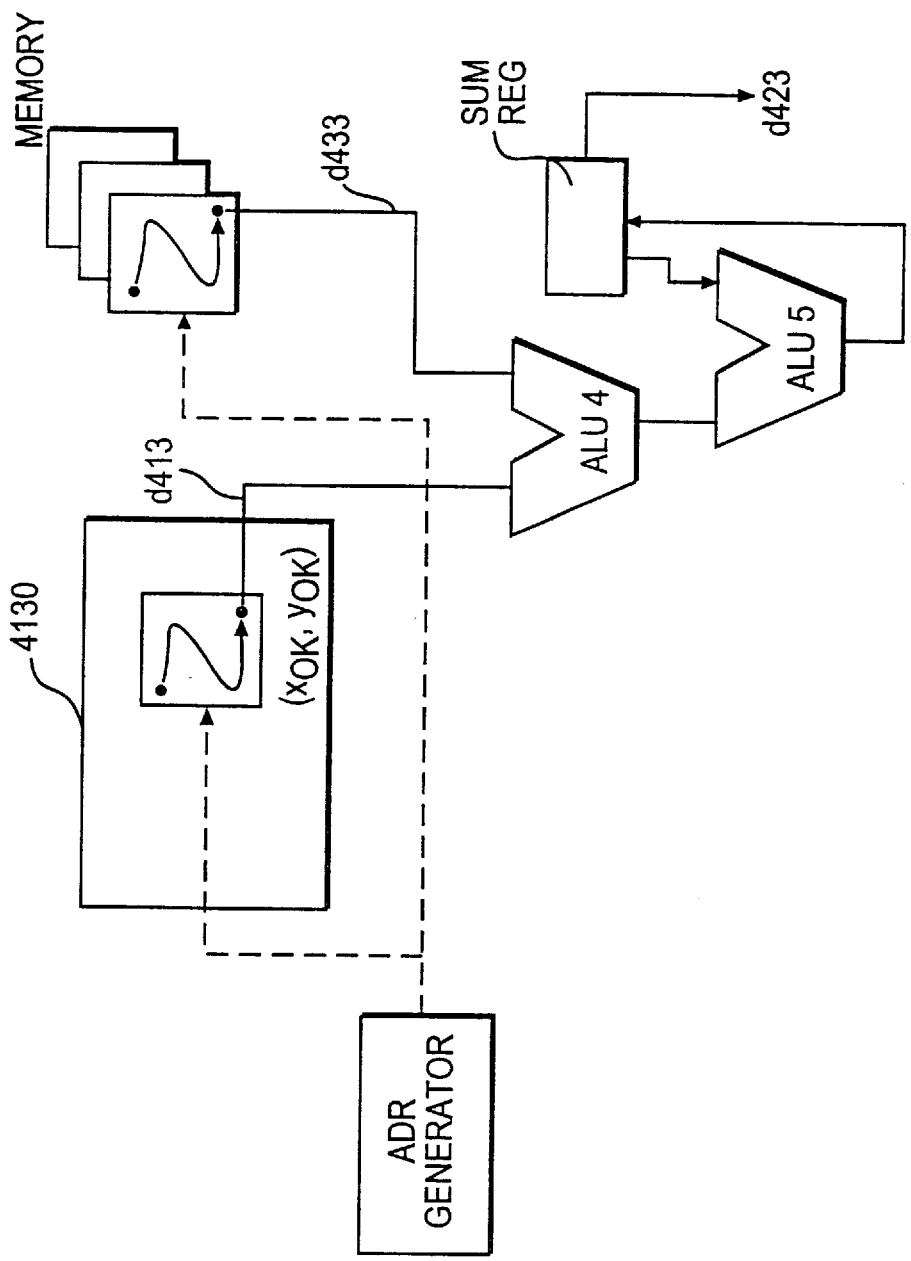
FIG. 27 is a diagram showing an explanation of the structure of the look matching unit 423.

FIG. 27, which is a detailed explanation of the configuration indicated in FIG. 23, shows an example of a hardware configuration for realizing the calculation of $M_{kl}$. That is, ALUs 4 and 5 in FIG. 27 perform the calculation of $M_{kl}$.

In general, the details of the calculation are the same as the ones indicated in FIG. 26. That is, $(G-T_{kl})^2$ is calculated in ALU 4 and a summation with respect to i and j is obtained by ALU 5.

The total judgement unit 44 of the look recognition unit 5 determines the final emotion type on the majority basis from the emotion types and degrees obtained from the configuration characteristics of respective partial images and from the emotion types and degrees obtained from the coordinate positions of respective partial images. An average of emotion degrees belonging to the same final emotion type is used as the final emotion degree (d5).

In determining the emotion type and degree to be obtained from the coordinate position of each partial image, the coordinate position at each point of a reference emotion image is stored in advance. The sum of differences of coordinate positions at respective points between the input image and reference image is obtained and used for the determination of the emotion type and degree. Namely, the emotion type of the reference image providing the minimum sum of differences is used as the final emotion type, and the emotion degree in inverse proportion to the minimum is used as the final emotion degree.

The data input/output section (6, 7) shown in FIG. 16 will be described next.

This section is used for storing data (1) in a floppy disk or reading it therefrom, the data (1) being original data from the data gloves inputted by a sign language user or the text data converted into a spoken language, and for storing data (2) in the floppy disk 6 or reading it therefrom, the data (2) being the parameters (weight coefficients) of the layer-type neural network of the conversion unit 21 of the sign language recognition section 2.

The read data (1) is sent to the monitor at the speech synthesizing unit or to the monitor at the sign language CG generating unit to display it. The read data (2) of parameters (weight coefficients) is set to the layer-type neural network of the conversion unit 21.

Figure 24:
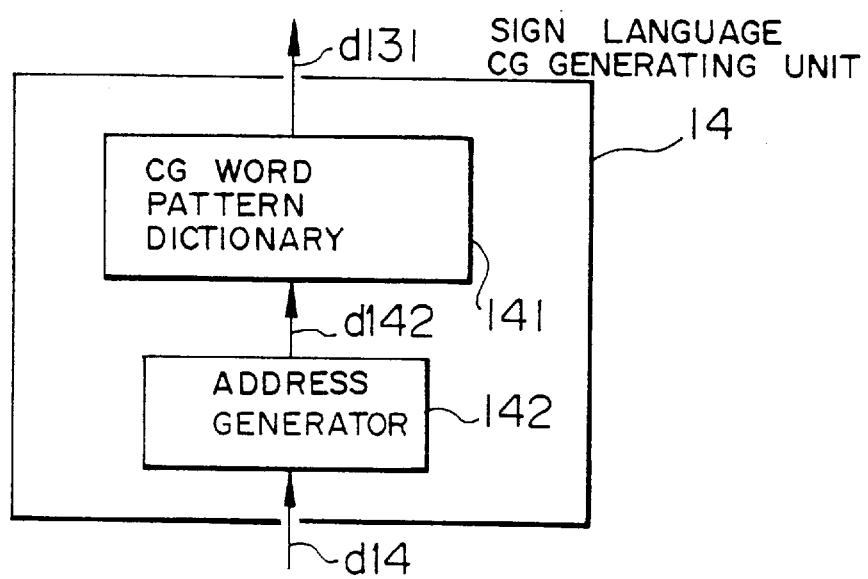
FIG. 24 is a diagram showing the structure of a sign language CG generating unit.

FIG. 24 shows the structure of the sign language CG generating unit 14. Word information indicated by d14 in FIG. 24 is supplied to an address generator 142 which generates the address of a CG word pattern corresponding to the supplied word information. A CG word pattern dictionary sends the designated CG word pattern d131 to the monitor 13 to display it.

Each section of the sign language translation system has been described in detail. With this structure, it is possible to realize the system capable of solving the conventional issues still not settled.

In the embodiment of the sign language translation system 100, wired data transfer has been assumed. All or part of the data transfer may be replaced by wireless data transfer to provide a better operability of the system.

Figure 25:
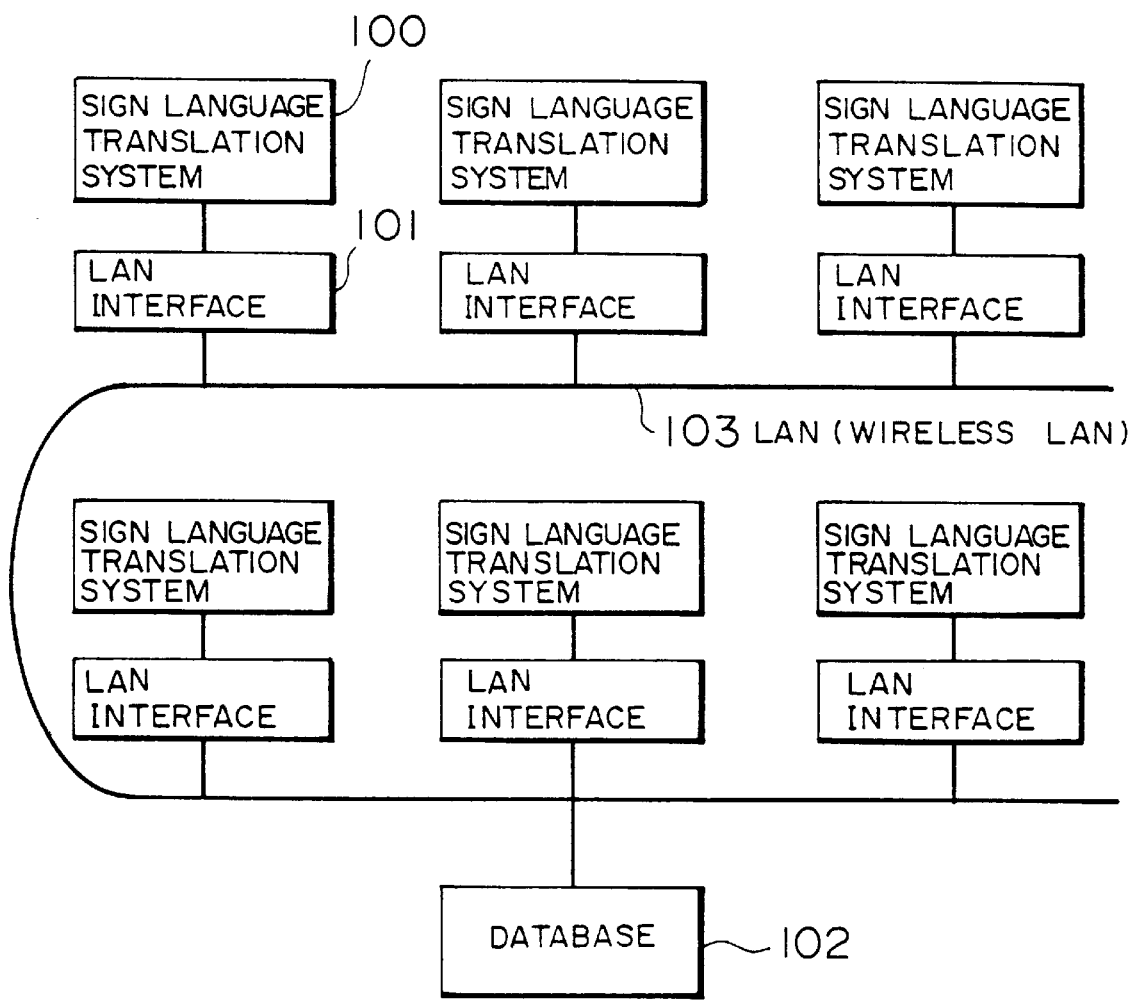
FIG. 25 is a diagram showing an example of the structure of another sign language translation system.

FIG. 25 shows a sign language translation system wherein a plurality of sign language translation systems 100 described above are interconnected by a local area network (LAN) 103 (or wireless LAN) via LAN interfaces 101. With such a system, data communication or an access to a database 102 by sign languages or gestures becomes possible within or between public or other facilities such as hospitals, police stations, and public offices.

According to the embodiment, a continuous sign language even with a personal difference can be dynamically recognized and converted into a spoken language.

It is also possible to recognize the look or emotion of a sign language user, allowing to generate a spoken language with emotion.

It is also possible to make it easy to have a conversation between a sign language user and an ordinary user.

It is apparent that the sign language translation apparatus and system of the second embodiment may be applied to the sign recognition apparatus of the first embodiment.

What is claimed is:

1. A sign language recognition apparatus for recognizing a continuously expressed sign language, comprising:

input means for inputting the continuously expressed sign language as a time sequential pattern;

means for generating a reference sign language pattern by averaging sample time sequential patterns;

means for storing said reference sign language pattern;

means for deriving characteristic points of said sign language time sequential pattern and said reference sign language pattern;

means for compressing said sign language time sequential pattern and said reference sign language pattern in accordance with said derived characteristic points; and means for matching said compressed time sequential pattern with said compressed reference sign language pattern to recognize said continuously expressed sign language.

2. A sign language recognition apparatus according to claim 1, wherein said means for generating said reference sign language pattern includes means for obtaining correspondence points between said sample time sequential patterns having a nonlinear expansion/compression in a time axis direction, while nonlinearly moving said sample time sequential patterns in the time axis direction, and obtaining an average of said sample time sequential patterns at each said correspondence point.

3. A sign language recognition apparatus according to claim 1, wherein said matching means includes means for recognizing said continuously expressed sign language by sequentially matching said sign language time sequential pattern with said reference sign language pattern stored in advance while allowing a nonlinear expansion/compression in a time axis direction.

4. A sign language recognition apparatus according to claim 1, further comprising means for compressing a sign language pattern by using, as said characteristic points specific to said sign language time sequential pattern, at least one of a time when a velocity vector becomes minimum, a time when a direction change of the velocity vector exceeds a threshold value, a time when an acceleration of the velocity vector becomes minimum.

5. A sign language recognition apparatus according to claim 4, further comprising means for compressing said sign language time sequential pattern by using at least ones of pattern vectors at said respective characteristic points, and time lengths between said characteristic points.

6. A recognition apparatus for recognizing a continuous pattern, comprising:
   input means for inputting a continuous pattern as a time sequential pattern;
   means for generating a reference continuous pattern by averaging sample time sequential patterns;
   means for storing said reference continuous pattern;
   means for deriving characteristic points of said input time sequential pattern and said reference continuous pattern;
   means for compressing said input time sequential pattern and said reference continuous pattern in accordance with said derived characteristic points; and
   means for matching said compressed input time sequential pattern with said compressed reference continuous pattern to recognize said continuous pattern.

7. A sign language recognition method of recognizing a continuously expressed sign language, comprising the steps of:
   inputting sample sign language patterns for generating a reference sign language pattern as a first time sequential pattern, and generating said reference sign language pattern by averaging said first time sequential patterns;
   inputting a sign language to be recognized as a second time sequential pattern;
   deriving characteristic points of said reference sign language pattern and said second time sequential pattern and;
   compressing said reference sign language pattern and said second time sequential pattern in accordance with said derived characteristic points; and
   matching said compressed reference sign language pattern with said compressed second time sequential pattern to recognize said sign language.

8. A sign language recognition method according to claim 8, further comprising the steps of:
   deriving first characteristic points from said reference sign language pattern, and in accordance with said first characteristic points,
   compressing said reference sign language pattern;
   deriving second characteristic points from said second time sequential pattern, and in accordance with said second characteristic points, compressing said second time sequential pattern; and
   matching said compressed reference sign language pattern with said compressed second time sequential pattern to recognize said sign language.

9. A sign language translation system comprising:
   (a) a first input means for inputting a continuously expressed sign language as time sequential data,
   (b) means for recognizing a sign language inputted as said time sequential data, and including
      (b-1) a sign language word dictionary for storing sign language time sequential data of each sign language word;
      (b-2) means for calibrating second sign language time sequential data inputted from said first input means; and
      (b-3) means for matching said time sequential data calibrated by said calibration means with said sign language time sequential data stored in said sign language word dictionary, and recognizing the sign language word corresponding to said time sequential data;
   (c) means for translating said recognized sign language into a spoken language;
   (d) a second input means for inputting a portrait of a sign user; and
   (e) look recognition means for recognizing the look of the portrait to obtain the emotion type and the emotion degree;
   wherein said translating means translates said recognized sign language into a spoken language according to the emotion type and the emotion degree in said look recognition means.

10. A sign language translation system according to claim 9, further comprising:
   matching means for receiving said second sign language time sequential data of a sign language word and said first sign language time sequential data corresponding to said second sign language time sequential data, obtaining and outputting correspondence therebetween at each timing; and
   selection means for selecting one of said second sign language time sequential data and an output of said matching means, and outputting said selected one to said calibration means,
   wherein said calibration means learns recognition parameters for the calibration in accordance with an output of said matching means.

11. A sign language translation system according to claim 10, wherein a neural network is further provided for learning said recognition parameters for the calibration.

12. A sign language translation system according to claim 9, wherein said translating means adds a dependent word to the sign language word outputted from said sign language recognition means, in accordance with a rule, and outputting a spoken language.

13. A sign language translation system according to claim 9, further comprising means for inputting a portrait of a sign language user, look recognition means for recognizing the look of the portrait to obtain the emotion type and the emotion degree (intensity), and processor means for inputting a spoken language outputted from said spoken language translation means and the emotion type and degree outputted from said look recognition means, and outputting a spoken language added with emotional adjectives.

14. A sign language translation system according to claim 13, further comprising sound output means for synthesizing and outputting sounds, wherein said processor means outputs sounds corresponding to the emotion type and degree.

15. A sign language translation system according to claim 13, further comprising test output means for outputting a text, wherein said processor means outputs said text corresponding to the emotion type and degree.

16. A sign language translation system according to claim 13, further comprising sign language graphics means for outputting a sign language as CG, wherein said processor means outputs said CG corresponding to the emotion type and degree.

17. A sign language translation system according to claim 13, further comprising voice input means having a microphone and voice recognition means.

18. A sign language translation system according to claim 13, further comprising character input means for inputting a character from a keyboard.

19. A sign language translation system according to claim 9, wherein said sign language translation system is installed at each of a plurality of stations connected to a local area network so that information can be transferred between a plurality of said sign language translation systems.

20. A sign language translation system, comprising:
(a) a first input means for inputting a continuously expressed sign language as time sequential data,
(b) means for recognizing a sign language inputted as said time sequential data, and including
(b-1) a sign language word dictionary for storing sign language time sequential data of each sign language word;
(b-2) means for calibrating second sign language time sequential data inputted from said first input means; and
(b-3) means for matching said time sequential data calibrated by said calibration means with said sign language time sequential data stored in said sign language word dictionary, and recognizing the sign language word corresponding to said time sequential data;
(c) means for translating said recognized sign language into a spoken language; and
(d) means for generating sign language words and displaying the generated sign language words on a display;
wherein said translating means translates said recognized sign language into a spoken language and said sign language generating means generates sign language for display on said display unit from said spoken language.

21. A plurality of sign language translation systems interconnected by a local area network (LAN) through respective LAN interfaces, each of said systems comprising:
(a) a first input means for inputting a continuously expressed sign language as time sequential data,
(b) means for recognizing a sign language inputted as said time sequential data, and including
(b-1) a sign language word dictionary for storing sign language time sequential data of each sign language word;
(b-2) means for calibrating second sign language time sequential data inputted from said first input means; and
(b-3) means for matching said sign language time sequential data calibrated by said calibration means with said time sequential data stored in said sign language word dictionary, and recognizing the sign language word corresponding to said time sequential data;
(c) means for translating said recognized sign language into a spoken language;
(d) a second input means for inputting a portrait of a sign user;
(e) look recognition means for recognizing the look of the portrait to obtain the emotion type and the emotion degree;

wherein said translating means translates said recognized sign language into a spoken language according to the emotion type and the emotion degree in said look recognition means.

22. A sign language recognition method of recognizing a continuously expressed sign language, comprising the steps of:
inputting a sign language to be recognized as a time sequential pattern;
deriving characteristic points of said input time sequential pattern;
compressing said input time sequential pattern in accordance with said derived characteristic points; and
matching said compressed input time sequential pattern with a compressed reference sign language pattern to recognize said sign language;
wherein said compressed reference sign language is compressed in accordance with characteristic points of a reference time sequential pattern.

23. A sign language recognition method according to claim 22:
wherein each of said characteristic points represents a pattern at a time, at least, when a velocity vector becomes minimum and when a direction of the velocity vector is changed.

24. A sign language recognition method according to claim 23:
wherein said input time sequential pattern and said reference time sequential pattern are compressed using said characteristic points and a time length between said characteristic points; and
wherein said compressed input time sequential pattern is matched with a compressed reference sign language pattern using said characteristic points and said time length between said characteristic points, while allowing a nonlinear expansion/compression in a time axis direction.

25. A sign language recognition method according to claim 22, wherein said reference time sequential pattern is generated by averaging a plurality of sample time sequential patterns.

26. A sign language recognition method according to claim 25, further comprising the steps of:
obtaining correspondence points between said sample time sequential patterns having a nonlinear expansion/compression in a time axis direction; and
calculating an average of said plurality of sample time sequential patterns at each of said correspondence points.

27. A method of recognizing a continuous pattern, comprising the steps of:
inputting a continuous pattern to be recognized as a time sequential pattern;
deriving characteristic points of said input time sequential pattern;
compressing said input time sequential pattern in accordance with said derived characteristic points; and
matching said compressed input time sequential pattern with a compressed reference continuous pattern to recognize said continuous pattern;
wherein said compressed reference continuous pattern is compressed in accordance with characteristic points of a reference time sequential pattern.

28. A sign language translation method, comprising the steps of:

inputting a continuously expressed sign language as time sequential data;

calibrating said input time sequential data for absorption of personal difference between sign language users;

recognizing said input sign language by matching said calibrated time sequential data with a sign language time sequential data stored in a sign language word dictionary;

translating said recognized sign language into a spoken language; and outputting said translated spoken language.

29. A sign language translation method according to claim 28, wherein said translated spoken language is outputted as voices, texts on a display.

30. A sign language translation method according to claim 28, further comprising the steps of:

inputting a portrait of a sign user; and recognizing the look of the portrait to obtain an emotion type and a emotion degree;

wherein said translated spoken language is reflected the emotion type and the emotion degree.

* * * * *